United States Patent
Ota et al.

(10) Patent No.: US 12,135,541 B2
(45) Date of Patent: Nov. 5, 2024

(54) MANAGEMENT METHOD AND MANAGEMENT DEVICE

(71) Applicant: SINTOKOGIO, LTD., Nagoya (JP)

(72) Inventors: Kazuhiro Ota, Toyokawa (JP); Takeshi Sonohara, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 347 days.

(21) Appl. No.: 17/619,012

(22) PCT Filed: Jun. 8, 2020

(86) PCT No.: PCT/JP2020/022570
§ 371 (c)(1),
(2) Date: Dec. 14, 2021

(87) PCT Pub. No.: WO2020/255782
PCT Pub. Date: Dec. 24, 2020

(65) Prior Publication Data
US 2022/0350314 A1 Nov. 3, 2022

(30) Foreign Application Priority Data
Jun. 21, 2019 (JP) ................................. 2019-115739

(51) Int. Cl.
*G06F 3/0482* (2013.01)
*G05B 19/418* (2006.01)
*G06F 3/14* (2006.01)

(52) U.S. Cl.
CPC ..... *G05B 19/41865* (2013.01); *G06F 3/0482* (2013.01); *G06F 3/1423* (2013.01); *G05B 2219/32015* (2013.01)

(58) Field of Classification Search
CPC ................................................ G06F 3/048–05
See application file for complete search history.

(56) References Cited

U.S. PATENT DOCUMENTS

| | | | |
|---|---|---|---|
| 5,810,918 A | * | 9/1998 | Landis ........................ C10L 5/04 |
| | | | 106/38.22 |
| 11,159,389 B1 | * | 10/2021 | Miriyala ............... H04L 41/142 |
| 2004/0030429 A1 | * | 2/2004 | Baba ................... G05B 23/0272 |
| | | | 700/83 |

(Continued)

FOREIGN PATENT DOCUMENTS

| | | |
|---|---|---|
| CN | 1704955 A | 12/2005 |
| CN | 102281432 A | 12/2011 |

(Continued)

OTHER PUBLICATIONS

International Search Report and Written Opinion dated Aug. 4, 2020.

(Continued)

*Primary Examiner* — Daniel Rodriguez
(74) *Attorney, Agent, or Firm* — Harness, Dickey & Pierce, P.L.C.

(57) ABSTRACT

A management method for managing a production line including a plurality of steps includes carrying out a first displaying process and carrying out a second displaying process, wherein, among a first indicator group (I1), an indicator corresponding to a certain step functions as a GUI element configured to change a screen to be displayed on a display from a top screen (G1) to a second screen.

10 Claims, 17 Drawing Sheets

(56) References Cited

U.S. PATENT DOCUMENTS

| | | | | |
|---|---|---|---|---|
| 2008/0084297 A1* | 4/2008 | Namioka | ........... | G05B 23/0235 |
| | | | | 340/540 |
| 2012/0151399 A1* | 6/2012 | Soerensen | ............. | G06F 16/904 |
| | | | | 715/769 |
| 2018/0259944 A1* | 9/2018 | Oka | ..................... | G05B 19/418 |
| 2018/0268580 A1 | 9/2018 | Nomamoto et al. | | |
| 2020/0184692 A1* | 6/2020 | Yang | .................. | G05B 19/4155 |

FOREIGN PATENT DOCUMENTS

| | | |
|---|---|---|
| CN | 104364724 A | 2/2015 |
| CN | 108369411 A | 8/2018 |
| JP | 07-141019 | 6/1995 |
| JP | 2003-167624 A | 6/2003 |
| JP | 2008-034817 A | 2/2008 |
| JP | 2014-119871 A | 6/2014 |
| WO | WO-2002/035302 A1 | 5/2002 |
| WO | WO-2017/094472 A1 | 6/2017 |
| WO | WO-2019/003524 A1 | 1/2019 |

OTHER PUBLICATIONS

Chinese Office Action for Chinese Application No. 202080044981.3 and English machine translation thereof dated Feb. 6, 2024.
Chinese Office Action for Chinese Application No. 202080044981.3 and English machine translation thereof dated Jun. 21, 2024.
Japanese Office Action and partial English translation mailed Nov. 22, 2022.

\* cited by examiner

FIG. 4
SAND TREATMENT SCREEN
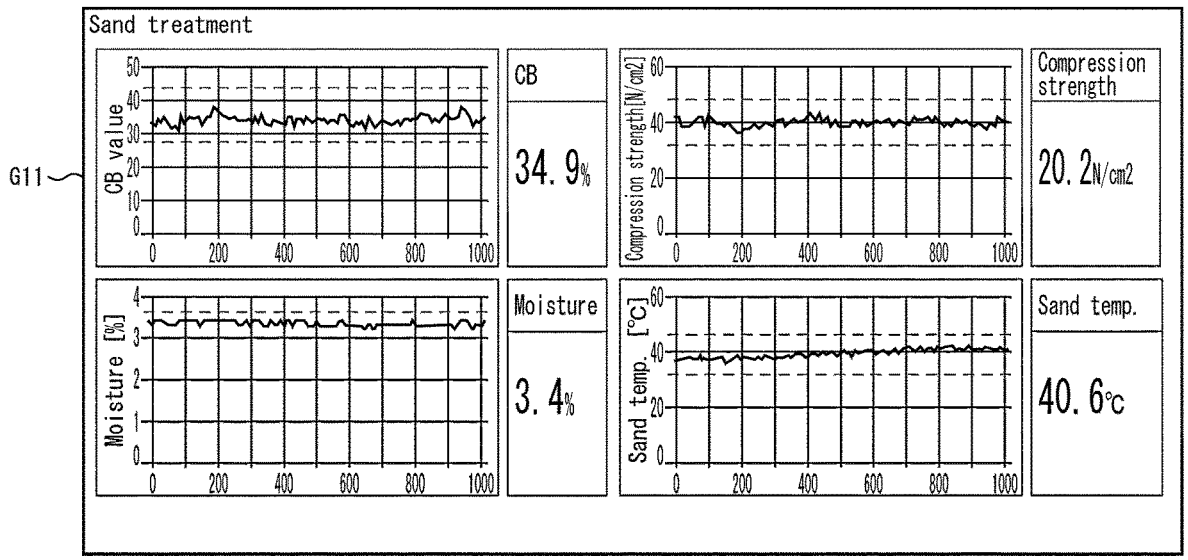
MOLDING SCREEN
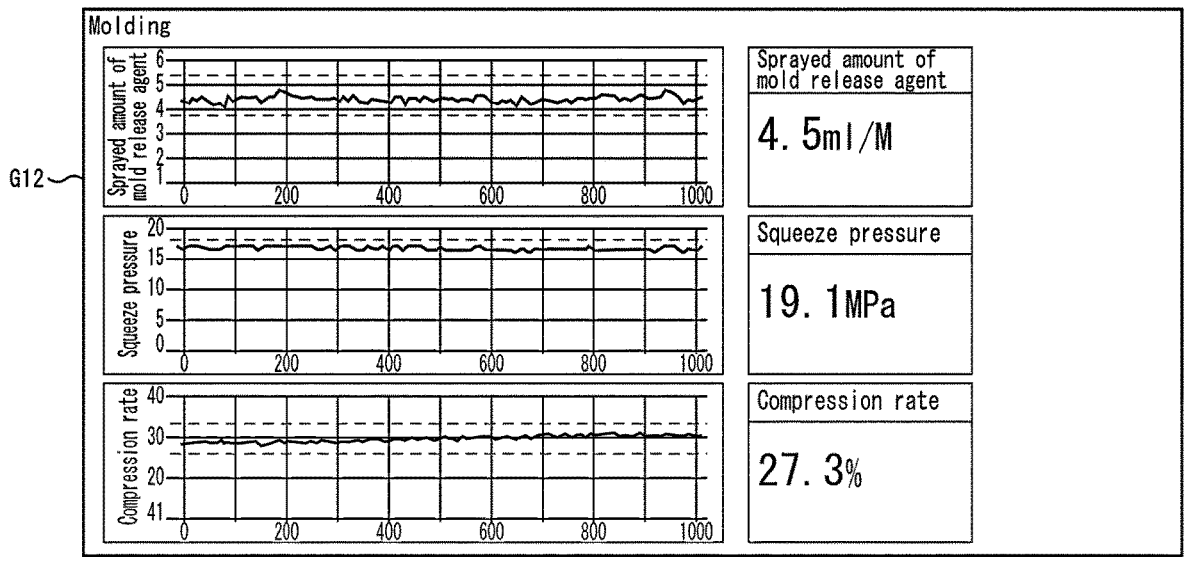
CORE SCREEN
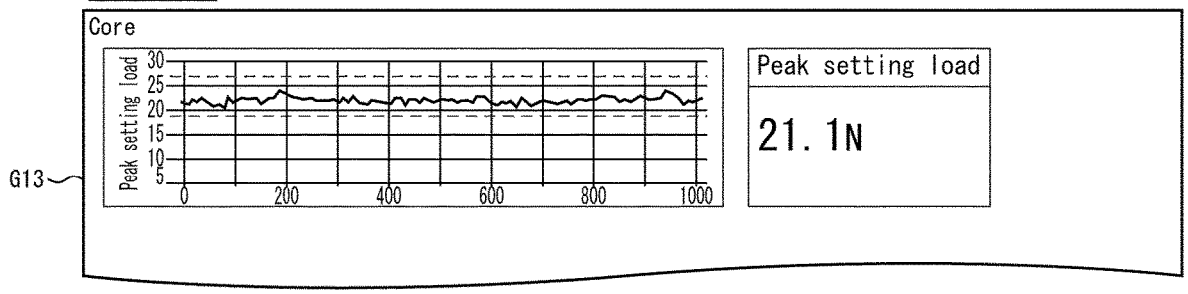

FIG. 5
MELTING AND POURING SCREEN
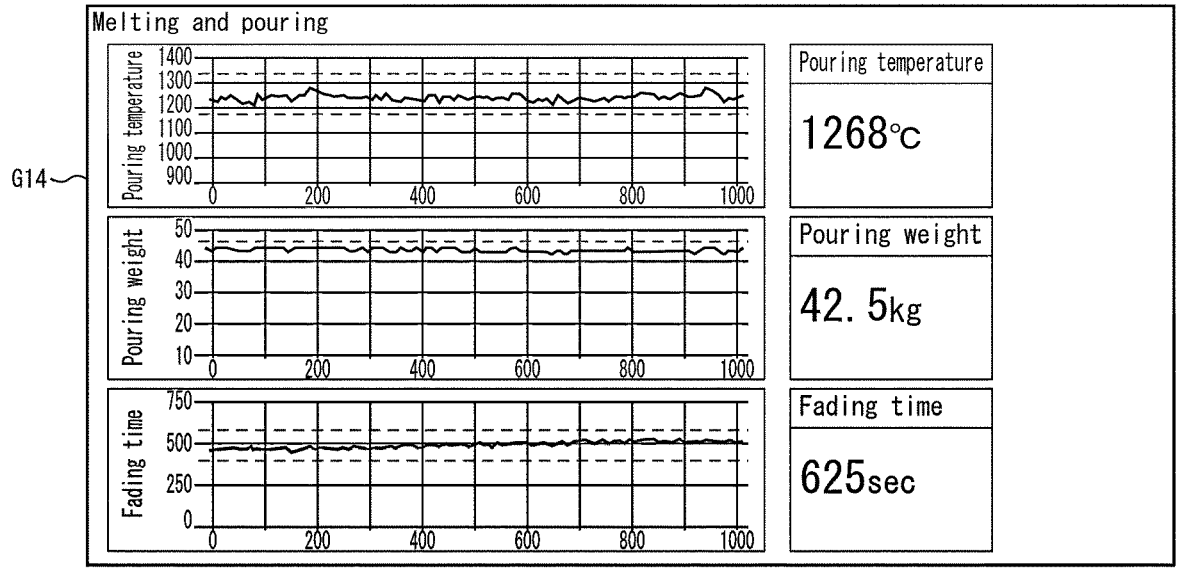
COOLING AND TRANSFER SCREEN
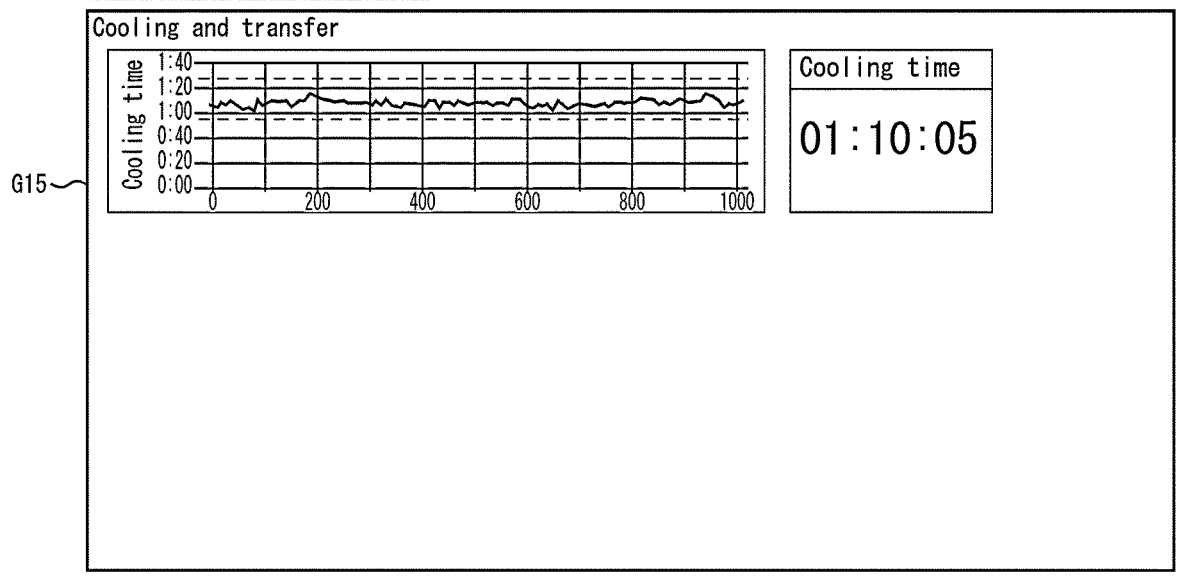

FIG. 8
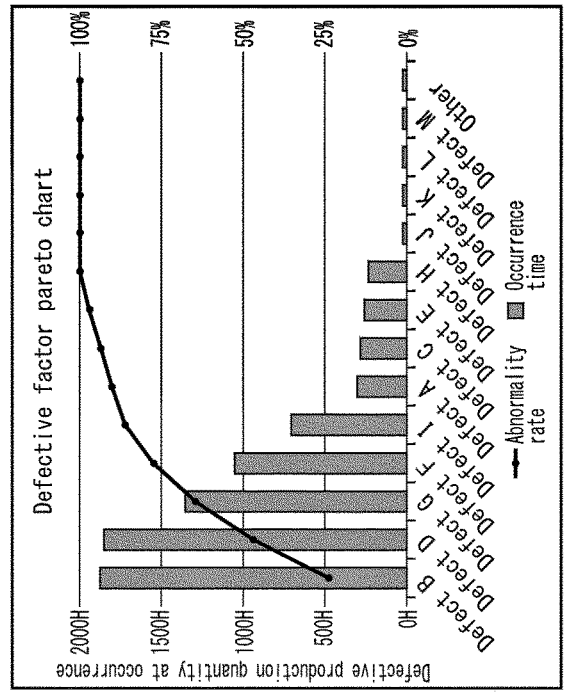
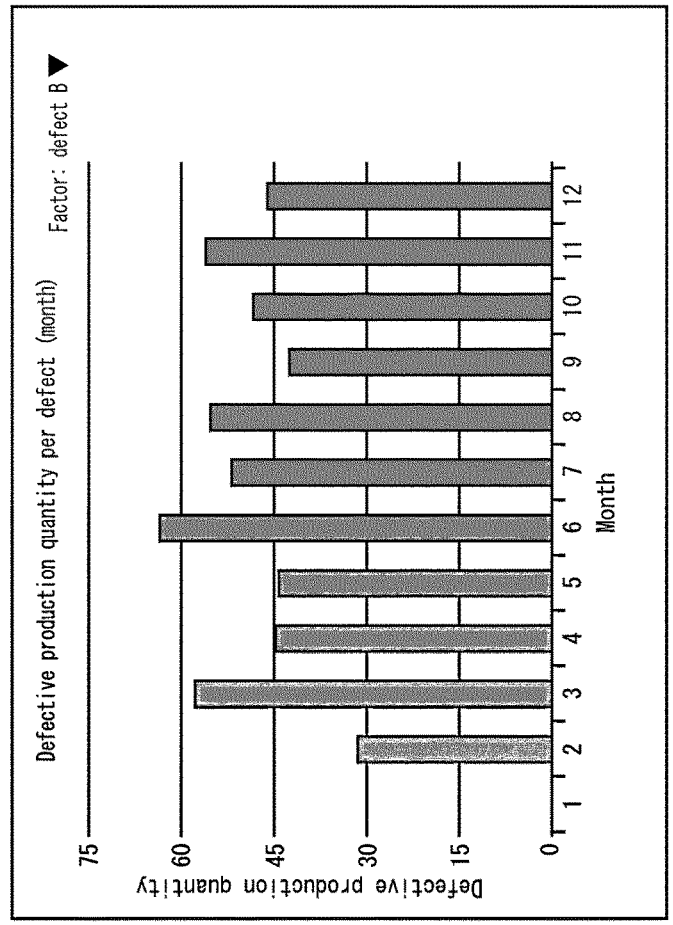

FIG. 9

INSPECTION RESULT MANUAL INPUT SCREEN
                                                                             G18

Inspection result input
A180      A181
◉ Manual input  ○ CSV
Identification ID [      ] ~A182                A183

| External defect | | | Internal defect | | Material defect | |
|---|---|---|---|---|---|---|
| ○ Without ◉ With | | | ◉ Without ○ With | | ◉ Without ○ With | |
| Defect A | + | − | FactorA | | | |
| Defect B | + | − | FactorB | | | |
| Defect C | + | − | FactorC | | | |
| Defect D | + | − | | | | |
| Defect E | + | − | | | | |

[Save]

INSPECTION RESULT CSV SCREEN
                                                                             G181

Inspection result input
A180      A181
○ Manual input  ◉ CSV  [Template] ~A184        A185

[                           ] [Browse]
                                     [Load]

FIG. 10

DEFECTIVE FACTOR LIST SCREEN

FIG. 17

| MIA | : Normal | ~A2111 |
| Sand treatment line | : Normal | ~A2112 |
| MIE | : Abnormal stop | ~A2113 |
| Dust collection machine | : Normal | ~A2114 |

A211

Abnormality content
\* \* \* \* \* \* \* \* \*
06/10/2019    10:30:30

Date and time of occurrence
06/10/2019

Date and time of recovery
10:20:30

A212

G21

MANAGEMENT METHOD AND MANAGEMENT DEVICE

TECHNICAL FIELD

The present invention relates to a management method and a management device each for managing a production line including a plurality of steps.

BACKGROUND ART

As a management method for managing a production line including a plurality of steps, for example, Patent Literature 1 discloses a technique according to which measurement values and/or the like obtained by measurement carried out for measurement items of the steps included in the production line are classified into production-related information, security-related information, and product quality information and the pieces of information thus classified are displayed on a screen.

Patent Literatures 2 and 3 each disclose a technique for displaying a reaction step guidance list screen including a plurality of blocks indicating the contents of abnormalities in the steps in a production line.

Patent Literature 4 discloses a technique for displaying a list showing of the states of products obtained in the steps of a production line.

CITATION LIST

Patent Literature

[Patent Literature 1]
Japanese Patent Application Publication Tokukaihei No. 7-141019 (Publication date: Jun. 2, 1995)
[Patent Literature 2]
Japanese Patent Application Publication Tokukai No. 2003-167624 (Publication date: Jun. 13, 2003)
[Patent Literature 3]
International Publication No. WO 2002/035302 (Publication date: May 2, 2002)
[Patent Literature 4]
Japanese Patent Application Publication Tokukai No. 2008-34817 (Publication date: Feb. 14, 2008)

SUMMARY OF INVENTION

Technical Problem

In order to manage a production line including a plurality of steps, a technique for suitably managing the states of the steps is required. However, according to Patent Literature 1, the measurement values and/or the like obtained by the measurement carried out for the measurement items of the steps included in the production line are displayed not on a per-step basis but on a per-information basis, i.e., for the production-related information, the security-related information, and the product quality information. Therefore, it is impossible to manage the states of the respective steps. According to Patent Literatures 2 and 3, the plurality of blocks in the reaction step guidance list screen merely indicate the contents of abnormalities in the respective steps of the production line. Therefore, a manager cannot grasp the states of the respective steps. According to Patent Literature 4, the list of the states of the products obtained in the steps of the production line is displayed. However, it is difficult to grasp the states of the steps from the list. Although Patent Literature 4 discloses an aspect in which a screen indicating the details of the product is displayed in response to clicking on an aggregation map area in the list, this area is far away from an area indicating the state of the product obtained in the step. Therefore, it is difficult for a manager to grasp the states of the respective steps. Therefore, with the conventional techniques as those disclosed in Patent Literatures 1 to 4, it is impossible to suitably manage the states of the respective steps included in the production line.

The present invention was made in order to solve the above-described problems, and an aspect of the present invention has an object to provide a management method and a management device each capable of suitably managing the states of the respective steps included in a production line.

Solution to Problem

In order to attain the object, a management method in accordance with one aspect of the present invention is a management method for managing a production line including a plurality of steps. The management method includes: carrying out a first displaying process for displaying, on a display, a first screen configured to indicate states of the respective plurality of steps by a first indicator group constituted by indicators corresponding to the plurality of steps; and carrying out a second displaying process for displaying, on the display, a second screen configured to indicate further details of a certain step among the plurality of steps. Among the first indicator group, an indicator corresponding to the certain step functions as a graphical user interface element configured to change a screen to be displayed on the display from the first screen to the second screen.

With the above-described configuration, among the first indicator group indicated on the first screen, the indicator corresponding to the certain step functions as a GUI element configured to change the screen to be displayed on the display from the first screen to the second screen, which is configured to indicate further details of the state of the certain step.

Consequently, it is possible to more suitably present, to the manager, the states of the respective steps included in the production line, as compared to the technique of Patent Literature 1 according to which the states are displayed on the screen not on a per-step basis but on a per-information basis, i.e., for the production-related information, the security-related information, and the product quality information, the techniques of Patent Literatures 2 and 3 according to which only the contents of abnormalities in the steps are displayed on the screen, and the technique of Patent Literature 4 according to which the list indicating the states of the products obtained in the respective steps of the production line is displayed on the screen. Consequently, it is possible to suitably manage the states of the respective steps included in the production line.

A management method in accordance with an aspect of the present invention is a management method for managing a production line including a plurality of steps, and is a management method for managing a production line including a plurality of steps. The management method includes: carrying out a first displaying process for displaying, on a display, a first screen configured to indicate (a) states of the respective plurality of steps by a first indicator group constituted by indicators corresponding to the plurality of steps and (b) operating states of production devices used in the plurality of steps by a second indicator group constituted by indicators corresponding to the plurality of steps; carrying out a second displaying process for displaying, on the display, a second screen configured to indicate further details of a certain step among the plurality of steps; and carrying out a third displaying process for displaying, on the display, a third screen configured to indicate further details of an operating state of a production device used in a certain step. Among the first indicator group, an indicator corresponding to a certain step functions as a graphical user interface element configured to change a screen to be displayed on the display from the first screen to the second screen. Among the second indicator group, an indicator corresponding to a certain step functions as a graphical user interface element configured to change the screen to be displayed on the display from the first screen to the third screen.

With the above-described configuration, the indicator on the first screen functions as a GUI configured to change the screen to be displayed on the display from the first screen to the second screen or as a GUI configured to change the screen to be displayed on the display from the first screen to the third screen. Consequently, the manager can grasp the states of the respective steps included in the production line or the states of the production devices used in the steps.

Note that the step whose detailed state is indicated in the second displaying process (such a step will be expressed as the "certain step") and the step whose detailed state is indicated in the third displaying process (such a step will be expressed as the "certain step") may be identical to each other or may be different from each other.

Advantageous Effects of Invention

In accordance with one aspect of the present invention, it is possible to provide a management method and a management device each capable of suitably managing the states of the respective steps included in a production line.

DESCRIPTION OF EMBODIMENTS

FIG. 4 is a view illustrating one example of a screen generated by the management device in accordance with Embodiment 1.

FIG. 5 is a view illustrating one example of a screen generated by the management device in accordance with Embodiment 1.

FIG. 8 is a view illustrating one example of a screen generated by the management device in accordance with Embodiment 1.

FIG. 9 is a view illustrating one example of a screen generated by the management device in accordance with Embodiment 1.

FIG. 10 is a view illustrating one example of a screen generated by the management device in accordance with Embodiment 1.

FIG. 17 is a view illustrating one example of a screen generated by the management device in accordance with Embodiment 2.

DESCRIPTION OF EMBODIMENTS

Embodiment 1

With reference to FIGS. 1 to 12, the following will describe a management method for managing, with use of a management system 1 in accordance with Embodiment 1, a production line 3 including a plurality of steps. Prior to the description of the management method, the management system 1 in accordance with Embodiment 1 will be described.

[Management System 1]

Figure 1:
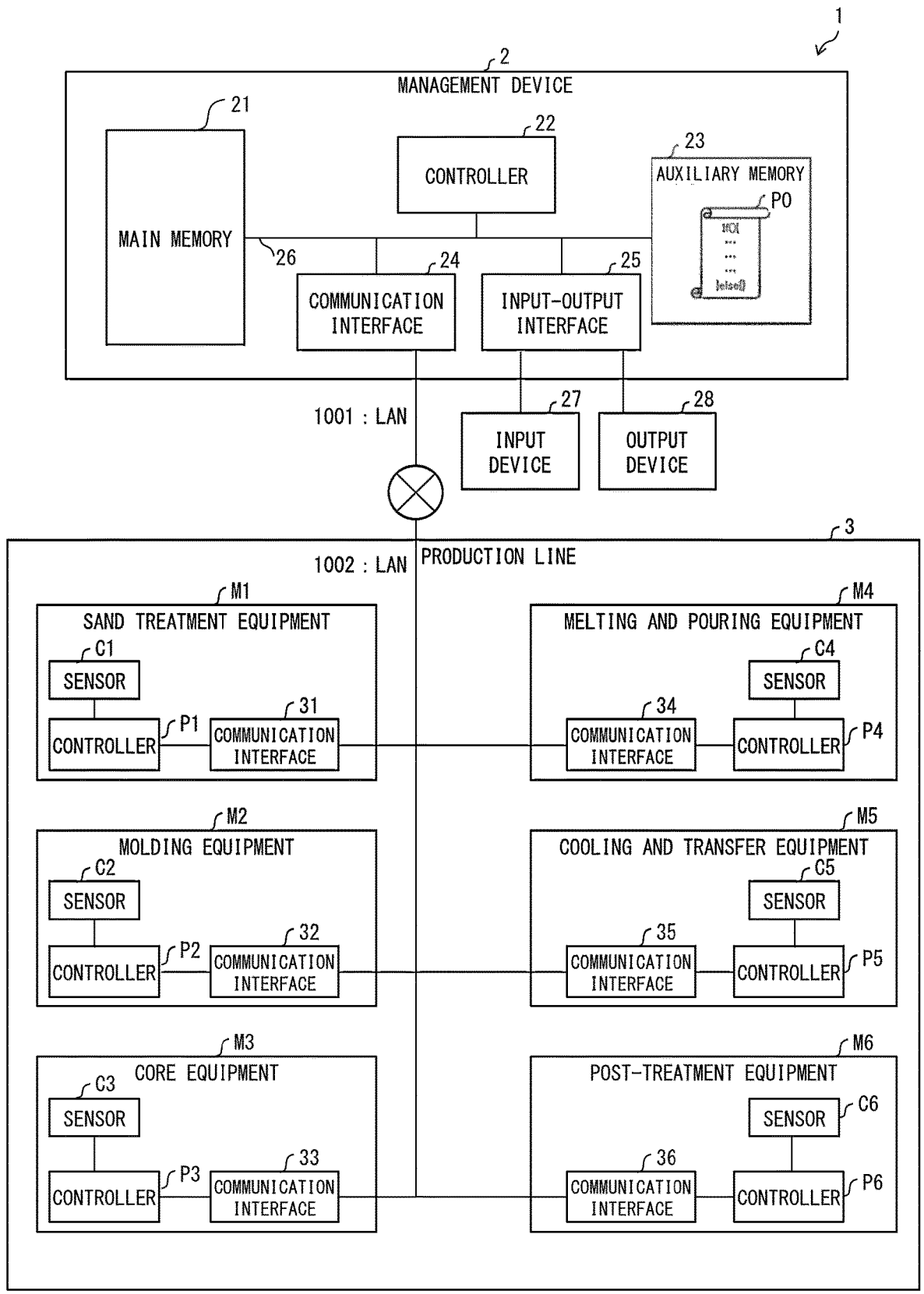
FIG. 1 is a block diagram illustrating a configuration of a management system in accordance with Embodiment 1.

FIG. 1 is a block diagram illustrating the management system 1 in accordance with Embodiment 1. As shown in FIG. 1, the management system 1 includes a management device 2 and a production line 3. With the management system 1, a manager can manage the states of the respective steps included in the production line 3 by monitoring, via a screen (e.g., a WEB screen) output to an output device 28 from the management device 2, the states of the respective steps included in the production line 3.

[Management Device 2]

As illustrated in FIG. 1, the management device 2 is a computer including a main memory 21, a controller 22, an auxiliary memory 23, a communication interface 24, and an input-output interface 25. The main memory 21, the controller 22, the auxiliary memory 23, the communication interface 24, and the input-output interface 25 are connected to each other via a bus 26. The controller 22 may be, for example, a single or a plurality of microprocessor(s), a single or a plurality of digital signal processor(s), a single or a plurality of microcontroller(s), or a combination of any of them. The main memory 21 may be, for example, a single or a plurality of semiconductor random access memories (RAMs). The auxiliary memory 23 may be, for example, a single or a plurality of Hard Disk Drive(s) (HDD(s)), a single or a plurality of Solid State Drive(s) (SSD(s)), or a combination of any of them. The auxiliary memory 23 may be partially or entirely a storage on a network connected to the management device 2 via the communication interface 24. The communication interface 24 is connected to the production line 3 via a wired or wireless Local Area Network (LAN) 1001 (e.g., Ethernet (registered trademark)). The input-output interface 25 may be, for example, a near field communication interface such as a Universal Serial Bus (USB) interface, infrared rays, Bluetooth (registered trademark), or a combination of any of them.

The input-output interface 25 is connected to an input device 27 and the output device 28, for example. The input device 27 may be, for example, a keyboard, a mouse, a touch pad, a microphone, or a combination of any of them. The output device 28 may be, for example, a display, a printer, a speaker, or a combination of any of them. The management device 2 may incorporate a keyboard and a touch pad each serving as the input device 27 and a display serving as the output device 28, like a laptop computer. Alternatively, the management device 2 may incorporate a touch panel serving as the input device 27 and the output device 28, like a smartphone or a tablet computer.

The auxiliary memory 23 stores therein a program P0 for causing the controller 22 to execute processes included in the management method. The controller 22 develops, in the main memory 21, the program P0 stored in the auxiliary memory 23. The controller 22 then executes the processes included in the management method, in accordance with the program P0 developed in the main memory 21. The auxiliary memory 23 further stores therein various kinds of data to which the controller 22 refers in order to execute the processes in the management method. The processes in the management method will be described in detail later with reference to FIG. 2.

In the aspect described in the above-described example, the controller 22 executes the processes in the management method in accordance with the program P0 stored in the auxiliary memory 23, which is an internal storage medium. However, Embodiment 1 is not limited to such an aspect. Alternatively, it is possible to employ an aspect in which the controller 22 executes the processes in the management method in accordance with the program P0 stored in an external storage medium. In this case, the external storage medium may be a computer-readable "non-temporary tangible medium", examples of which encompass tape, a disc, a card, a semiconductor memory, or a programmable logic device. Further alternatively, it is possible to employ an aspect in which the controller 22 executes the processes in the management method in accordance with the program P0 obtained from a network connected to the management device 2 via the communication interface 24. In this case, the network may be, for example, the Internet, a wired Local Area Network (LAN), a wireless LAN, or a combination of at least part of them.

[Production Line 3]

As shown in FIG. 1, the production line 3 includes sand treatment equipment M1, molding equipment M2, core equipment M3, melting and pouring equipment M4, cooling and transfer equipment M5, and post-treatment equipment M6. The sand treatment equipment M1 is configured to carry out a sand treatment among the plurality of steps included in the production line 3. The molding equipment M2 is configured to carry out molding. The core equipment M3 is configured to put a core into an object being managed (management object). The melting and pouring equipment M4 is configured to carry out melting and pouring. The cooling and transfer equipment M5 is configured to carry out cooling and transfer. The post-treatment equipment M6 is configured to carry out a post-treatment. The sand treatment, molding, core, melting and pouring, cooling and transfer, and post-treatment are well known as the plurality of steps included in the production line 3 to be carried out to produce a casting and/or the like, and therefore explanations thereof are omitted here. The production line 3 herein is a line for producing a casting and/or the like. However, the production line 3 is not limited to such a mode.

The management object refers to an object that is to be processed or used in each step. For example, a management object in the sand treatment step is collected sand, kneaded sand, and the like. In the molding step, a management object is a mold, kneaded sand, and the like. In the core step, a management object is a mold, kneaded sand, and/or the like. In the melting and pouring step, a management object is a molten metal, a mold, and/or the like. In the cooling and transfer step, a management object is a casting (product), a molten metal, a mold, and/or the like. In the post-treatment step, a management object is a mold, a casting (product), and/or the like. Note that the above-described steps and management objects are indicated merely by way of example. The steps only need to be a plurality of steps included in the production line 3. The management objects only need to be objects that are to be processed or used in the steps.

The sand treatment equipment M1, the molding equipment M2, the core equipment M3, the melting and pouring equipment M4, the cooling and transfer equipment M5, and the post-treatment equipment M6 respectively include sensors C1 to C6, controllers P1 to P6, and communication interfaces 31 to 36, and these pieces of equipment further include a plurality of production devices (not illustrated).

Each of the controllers P1 to P6 controls a production device in a corresponding one of the sand treatment equipment M1, the molding equipment M2, the core equipment M3, the melting and pouring equipment M4, the cooling and transfer equipment M5, and the post-treatment equipment M6. Thus, the controllers P1 to P6 respectively control the sand treatment equipment M1, the molding equipment M2, the core equipment M3, the melting and pouring equipment M4, the cooling and transfer equipment M5, and the post-treatment equipment M6. In one example, the controllers P1 to P6 are Programmable Logic Controllers (PLCs) configured to operate in accordance with programs for controlling the production devices in the sand treatment equipment M1, the molding equipment M2, the core equipment M3, the melting and pouring equipment M4, the cooling and transfer equipment M5, and the post-treatment equipment M6. The controllers P1 to P6 obtain information indicating states of the production devices in the sand treatment equipment M1, the molding equipment M2, the core equipment M3, the melting and pouring equipment M4, the cooling and transfer equipment M5, and the post-treatment equipment M6. Examples of the information indicating the states of the production devices encompass information indicating the power supply states and operating states of the production devices in the sand treatment equipment M1, the molding equipment M2, the core equipment M3, the melting and pouring equipment M4, the cooling and transfer equipment M5, and the post-treatment equipment M6 and information about these pieces of equipment measured by the sensors C1 to C6, which are respectively connected to the controllers P1 to P6 via wired or wireless connection. However, the information is not limited to such a mode. Note that the controllers P1 to P6 obtain the information about the pieces of equipment from output signals supplied from the sensors C1 to C6.

The controllers P1 to P6 are connected to the communication interface 24 of the management device 2 via their respective communication interfaces 31 to 36 and a LAN 1002.

[Management Method]

Figure 2:
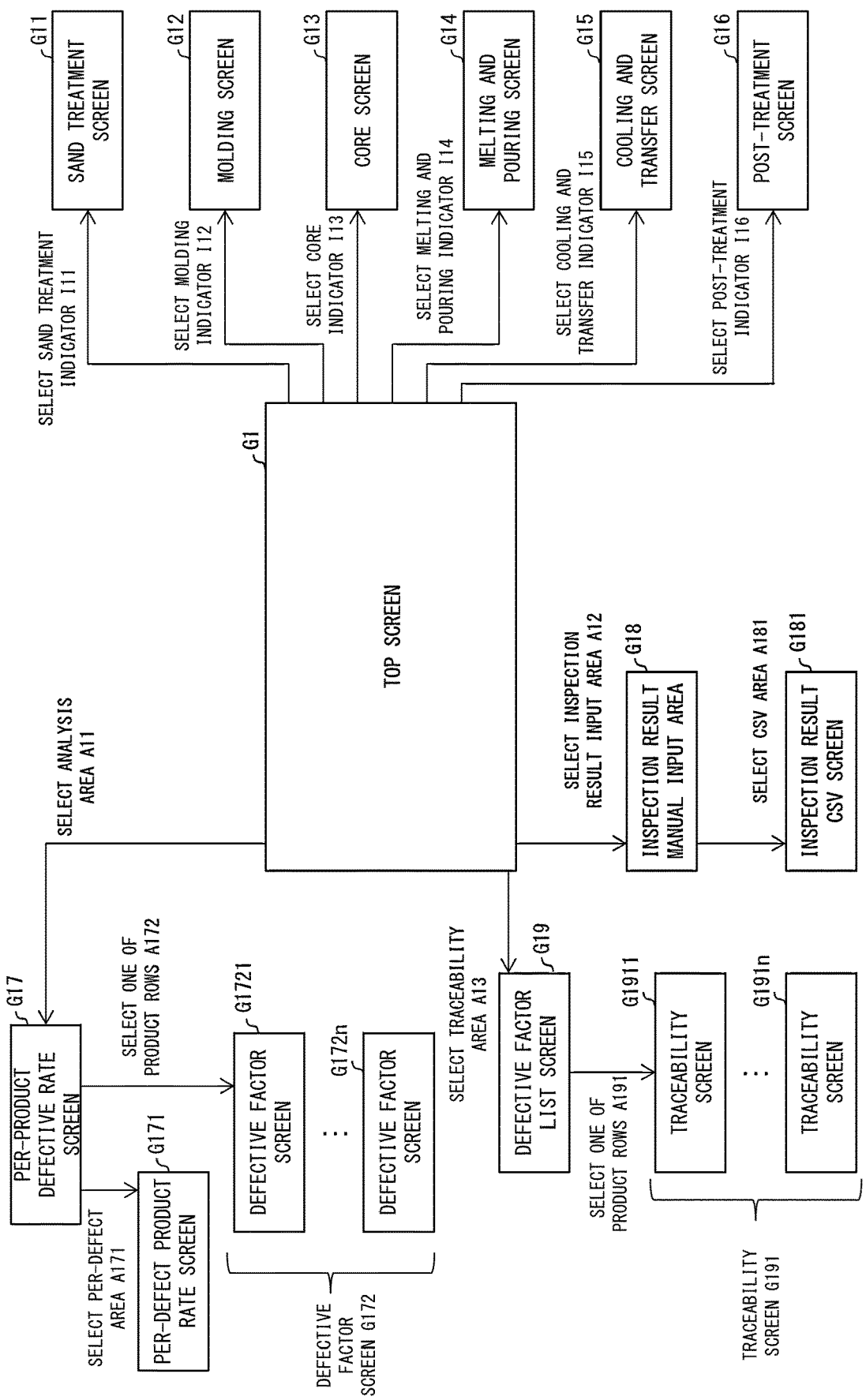
FIG. 2 is a screen change diagram illustrating how screens generated by a management device in accordance with Embodiment 1 are changed from one to another.

The management method in accordance with Embodiment 1 includes a first displaying process, a second displaying process, a third displaying process, and a fourth displaying process. With reference to FIGS. 2 to 12, the following will describe details of the management method in accordance with Embodiment 1. FIG. 2 is a screen change diagram illustrating how screens generated by the management device 2 in accordance with Embodiment 1 are changed from one to another. Each of FIGS. 3 to 12 is a view illustrating one example of the screen generated by the management device 2 in accordance with Embodiment 1.

(First Displaying Process and Second Displaying Process)

Figure 3:
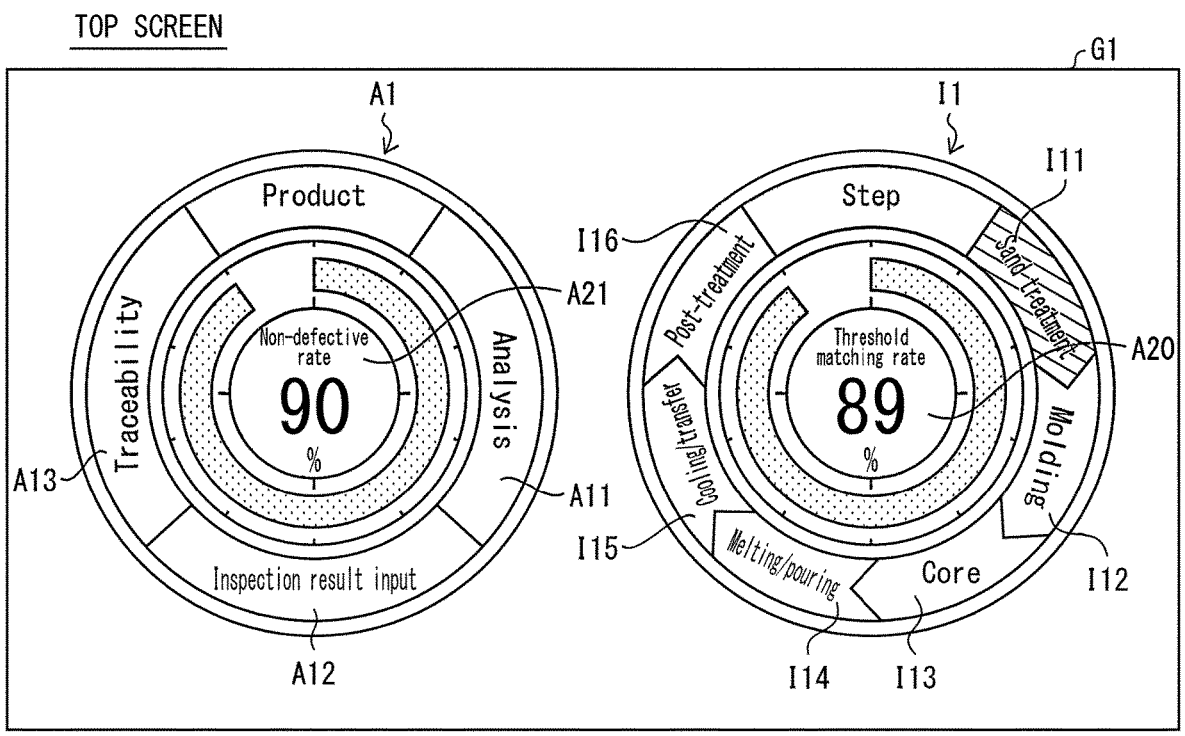
FIG. 3 is a view illustrating one example of a screen generated by the management device in accordance with Embodiment 1.

As shown in FIG. 3, the controller 22 of the management device 2 displays, on a display of the output device 28, a top screen (first screen) G1 including a first indicator group I1 and a screen change area group A1 (first displaying process). The first indicator group I1 is constituted by indicators that correspond to their respective steps included in the production line 3 and that comprehensively indicate the states of their respective steps.

In addition, the controller of the management device 2 displays, on the display of the output device 28, a second screen (for example, FIGS. 4 and 5) configured to indicate further details of the state of a certain step (hereinafter, referred to as a "selected step") selected from the plurality of steps in the first indicator group I1 indicated on the right part of FIG. 3 (second displaying process). That is, the controller 22 of the management device 2 displays, on the display of the output device 28, the second screen changed from the top screen G1 in response to a manipulation on the first indicator group I1 indicated on the right part of FIG. 3.

Here, as shown in FIG. 3, on the top screen G1, the first indicator group I1 is constituted by a sand treatment indicator I11, a molding indicator I12, a core indicator I13, a melting and pouring indicator I14, a cooling and transfer indicator I15, and a post-treatment indicator I16. Of these indicators, an indicator corresponding to the selected step functions as a graphical user interface (GUI) element configured to change a screen to be displayed on the display from the top screen G1 to the second screen.

Specifically, as shown in FIG. 2, when the manager selects the sand treatment indicator I11 via the input device 27, the top screen G1 is changed to a sand treatment screen (second screen) G11. When the manager selects the molding indicator I12, the top screen G1 is changed to a molding screen (second screen) G12. When the manager selects the core indicator I13, the top screen G1 is changed to a core screen (second screen) G13. When the manager selects the melting and pouring indicator I14, the top screen G1 is changed to a melting and pouring screen (second screen) G14. When the manager selects the cooling and transfer indicator I15, the top screen G1 is changed to a cooling and transfer screen (second screen) G15. When the manager selects the post-treatment indicator I16, the top screen G1 is changed to a post-treatment screen (second screen) G16. Here, as shown in FIGS. 4 and 5, the sand treatment screen G11, the molding screen G12, the core screen G13, the melting and pouring screen G14, and the cooling and transfer screen G15 indicate parameters defining the states of their corresponding steps. For example, FIG. 4 shows the sand treatment screen including horizontal axes each indicating the number of flasks of management objects, and vertical axes respectively indicating CB, a moisture content, a sand temperature, and a compression strength. Thus, the sand treatment screen in FIG. 4 indicates the parameters defining the state of the sand treatment in time series.

In this manner, among the plurality of indicators on the top screen G1, the indicator corresponding to the selected step functions as a GUI element configured to change the screen to be displayed on the display from the top screen G1 to the second screen configured to indicate further details of the state of the selected step. Consequently, it is possible to more suitably present, to the manager, the states of the respective steps included in the production line 3, as compared to the technique of Patent Literature 1 according to which the states are displayed on the screen not on a per-step basis but on a per-information basis, i.e., for the production-related information, the security-related information, and the product quality information, the techniques of Patent Literatures 2 and 3 according to which only the contents of abnormalities in the respective steps are displayed on the screen, and the technique of Patent Literature 4 according to which the list indicating the states of the products obtained in the respective steps of the production line 3 is displayed on the screen. As a result, it is possible to suitably manage the states of the respective steps included in the production line 3.

Among the plurality of indicators constituting the first indicator group I1 on the top screen G1 shown in FIG. 3, at least one indicator may be an indicator configured to indicate, in a stepwise manner, the state of a step corresponding to the at least one indicator. For example, in FIG. 3, the state of the sand treatment is not at a normal level, and therefore the sand treatment indicator I11 is indicated in a different color from those of the other indicators. In this case, when the state of the sand treatment is at an alert level, the sand treatment indicator I11 may be indicated in yellow. Meanwhile, when the state of the sand treatment is at a warning level, the sand treatment indicator I11 may be indicated in red. With this, the manager can grasp the normality of the product in a stepwise manner.

As shown in FIG. 3, the top screen G1 may include at least one of a threshold matching rate indication area A20 and a non-defective rate indication area A21. The threshold matching rate indication area A20 indicates a threshold matching rate indicating a rate of the number of times of inspections showing that the quality of the management object is within a threshold, among the number of times of inspections carried out on the quality of the management object to be processed or used in each step. The non-defective rate indication area A21 indicates a non-defective rate of final products having been produced (i.e., a non-defective rate of products). Thus, with the above-described configuration, it is possible to more suitably manage the states of the respective steps.

As shown in FIG. 3, on the top screen G1, the first indicator group I1 may be annularly arranged so as to surround the threshold matching rate indication area A20. With this, it is possible to present, to the manager, the information indicated by the first indicator group I1 and the threshold matching rate indication area (non-defective rate indication area) A20, in such a manner that the manager can more easily grasp the information visually. Alternatively, the screen change area group A1 may be annularly arranged so as to surround the non-defective rate indication area A21. With this, it is possible to present, to the manager, the information indicated by the screen change area group A1 and the non-defective rate indication area A21, in such a manner that the manager can more easily grasp the information visually.

(Third Displaying Process and Fourth Displaying Process)

The controller 22 of the management device 2 displays, on the display, a third screen configured to indicate defective rates on a per-product-kind basis or on a per-defect-kind basis, for products having been produced (third displaying process). Alternatively, in place of the third screen, the controller 22 of the management device 2 may display, on the display, a fourth screen configured to indicate defective factors on a per-product basis, for the products having been produced (fourth displaying process).

As shown in FIG. 3, the top screen G1 includes the screen change area group A1 including an analysis area (first area) A11, an inspection result input area A12, and a traceability area (second area) A13. The analysis area A11 functions as a GUI element configured to change the screen to be displayed on the display from the top screen G1 to the third screen. The traceability area A13 functions as a GUI element configured to change the screen to be displayed on the display from the top screen G1 to the fourth screen.

Specifically, as shown in FIGS. 2 and 3, when the manager selects the analysis area A11 via the input device 27, the top screen G1 is changed to a per-product defective rate screen (third screen) G17. When the manager selects the inspection result input area A12, the top screen G1 is changed to the inspection result manual input screen G18. When the manager selects the traceability area A13, the top screen G1 is changed to a defective factor list screen (fourth screen) G19. Thus, with the top screen G1 including not only the first indicator group I1 indicating the states of the respective steps but also the screen change area group A1, the manager can grasp the tendency of the defects of the products having been produced.

Figure 6:
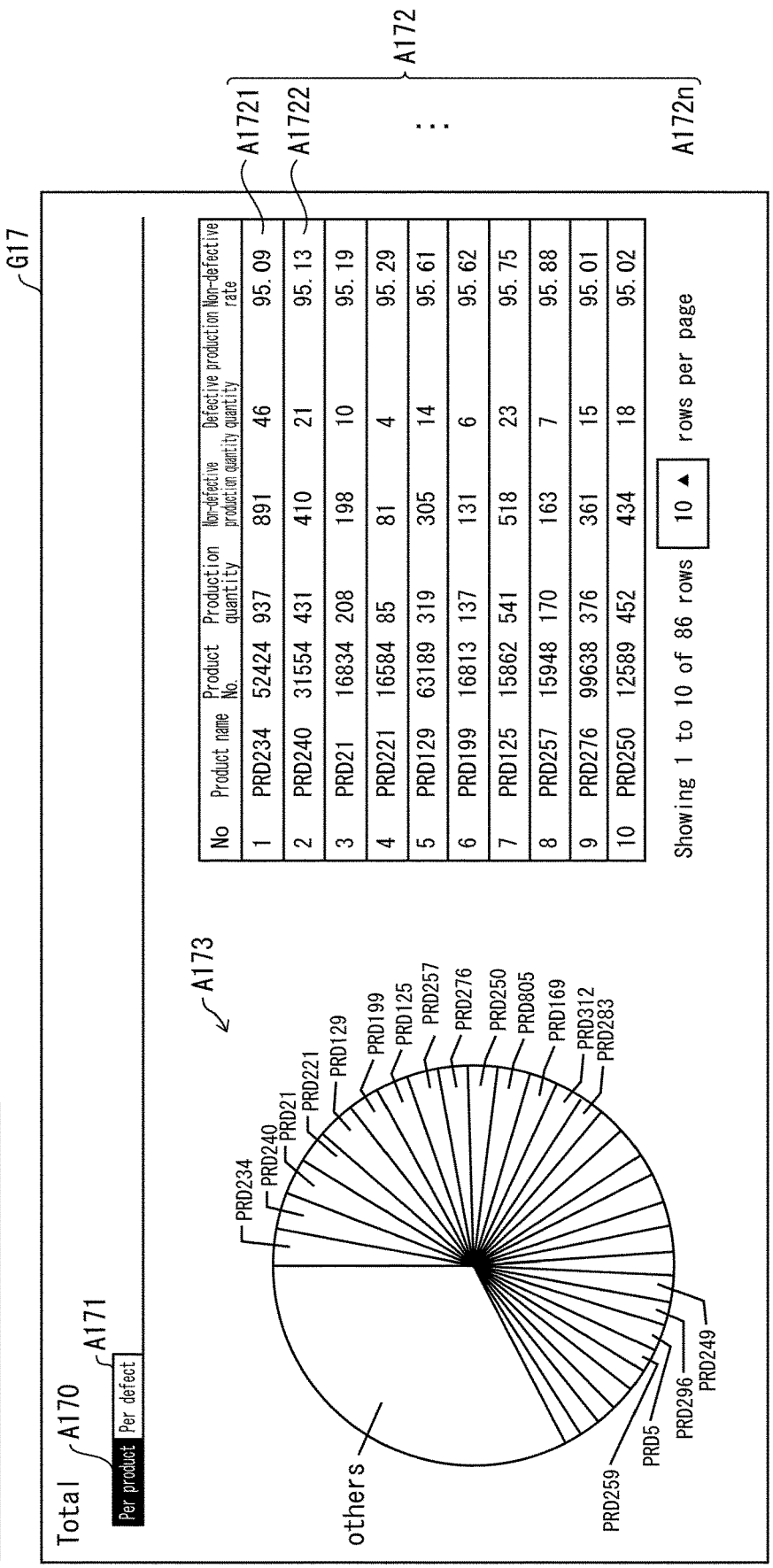
FIG. 6 is a view illustrating one example of a screen generated by the management device in accordance with Embodiment 1.

As shown in FIG. 6, the per-product defective rate screen G17 indicates defective rates on a per-product-kind basis, for the products having been produced. Specifically, a pie chart 173 on the per-product defective rate screen G17 indicates, for defective products included in all the products produced within the last one month, defective rates on a per-product-kind basis (e.g., for each of the product names PRD234, PRD240, PRD21, PRD221, PRD129, PRD199, PRD125, PRD257, PRD276, PRD250, PRD805, PRD169, PRD312, PRD283, PRD249, PRD296, PRD5, and PRD259). That is, the pie chart 173 indicates the rates each obtained by dividing the number of defective products (i.e., defective production quantity) of one product kind (i.e., one product name) included in the products produced within the last one month, by the number of defective products included in all the products produced within the last one month. On the per-product defective rate screen G17, each product row A172 indicate the product number, the number of products produced (production quantity) within the last one month, the number of non-defective products, the number of defective products, and the non-defective rate for its respective product kind. For example, a product row A1722 indicates a non-defective rate of 95.13(%), which is a rate of 410 with respect to 431, where "410" is the number of non-defective products (i.e., non-defective production quantity) and "431" is the production quantity of the products with the product name PRD240 having been produced within the last one month. The per-product defective rate screen G17 further includes a per-product area A170 and a per-defect area A171.

Figure 7:
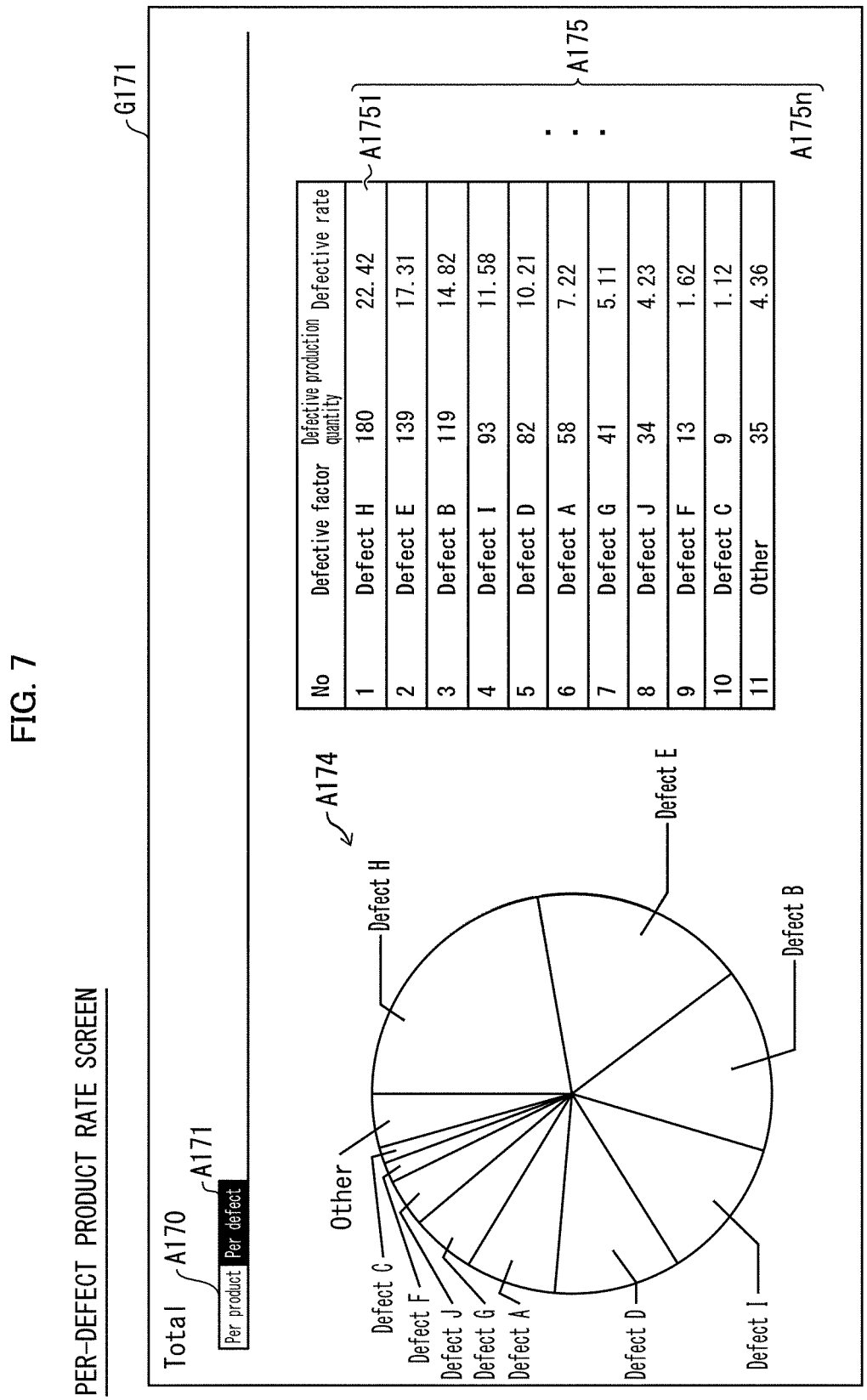
FIG. 7 is a view illustrating one example of a screen generated by the management device in accordance with Embodiment 1.

As shown in FIGS. 2 and 6, when the manager selects the per-defect area A171 on the per-product defective rate screen G17, the per-product defective rate screen G17 is changed (shifted) to a per-defect product rate screen (third screen) G171. Similarly, when the manager selects the per-product area A170 on the per-defect product rate screen G171, the per-defect product rate screen G171 is changed (shifted) to the per-product defective rate screen G17. As shown in FIG. 7, the per-defect product rate screen (third screen) G171 indicates defective rates on a per-defect-kind basis, for products having been produced. Specifically, a pie chart A174 on the per-defect product rate screen G171 indicates, for the defective products included in all the products produced within the last one month, defective rates on a per-defect-kind basis (e.g., for each of a defect A, a defect B, a defect C, a defect D, a defect E, a defect F, a defect G, a defect H, a defect I, and a defect J). That is, the pie chart A174 and the rows A175 for defective factors indicate rates each obtained by dividing the number of defective products of one of the defect kinds included in the products produced within the last one month, by the number of defective products included in all the products produced within the last one month.

In the above-described example, the controller 22 of the management device 2 displays, on the display, the third screen that is the per-product defective rate screen G17 or the per-defect product rate screen G171 for the products produced within the last one month. However, Embodiment 1 is not limited to such an aspect. The third screen only needs to be the one related to the products having been produced. Thus, via a setting screen (not illustrated), the manager can change the period of time set as "one month" to a desired period.

Meanwhile, as shown in FIG. 2, when the manager selects any of the product rows A172 on the per-product defective rate screen G17, the per-product defective rate screen G17 is changed to a defective factor screen G172. Here, as shown in FIG. 6, the per-product defective rate screen G17 indicates the product rows A172. Product rows A1721 to A172n, which are included in the product rows A172, can each function as a GUI element configured to change the screen to a corresponding one of the defective factor screens G1721 to G172n. For example, when the manager selects the product row A1722 on the per-product defective rate screen G17 shown in FIG. 6, the per-product defective rate screen G17 is changed to the defective factor screen G1722 shown in FIG. 8.

As shown in FIG. 8, the defective factor screen G1722 indicates (a) a defective factor pareto chart of products of its respective kind (herein, product name PRD240) having been produced within the last one month and (b) the number of defective products per defect kind indicated on a per-month basis. Consequently, the manager can more suitably grasp the tendency of the defects of the products having been produced.

As shown in FIG. 9, an inspection result manual input screen G18 includes an identification ID area A182 via which a product is uniquely identified and an inspection result input area A183. The manager can directly input various kinds of inspection results to these areas. Consequently, in accordance with the inspection results, the controller 22 of the management device 2 displays, on the display, the third screen or the fourth screen in a suitable manner. The inspection result manual input screen G18 further includes a manual input area A180 and a CSV area A181.

As shown in FIGS. 2 and 9, when the manager selects the CSV area A181 on the inspection result manual input screen G18, the inspection result manual input screen G18 is changed (shifted) to an inspection result CSV screen G181. Similarly, when the manager selects the manual input area A180 on the inspection result CSV screen G181, the inspection result CSV screen G181 is changed (shifted) to the inspection result manual input screen G18. As shown in FIG. 9, the CSV area A181 includes a template area A184 and a loading area A185. The manager can select the template area A184 to download a template file. Meanwhile, the manager can select the loading area A185 to load a CSV file that is an already-prepared list.

Figure 10:
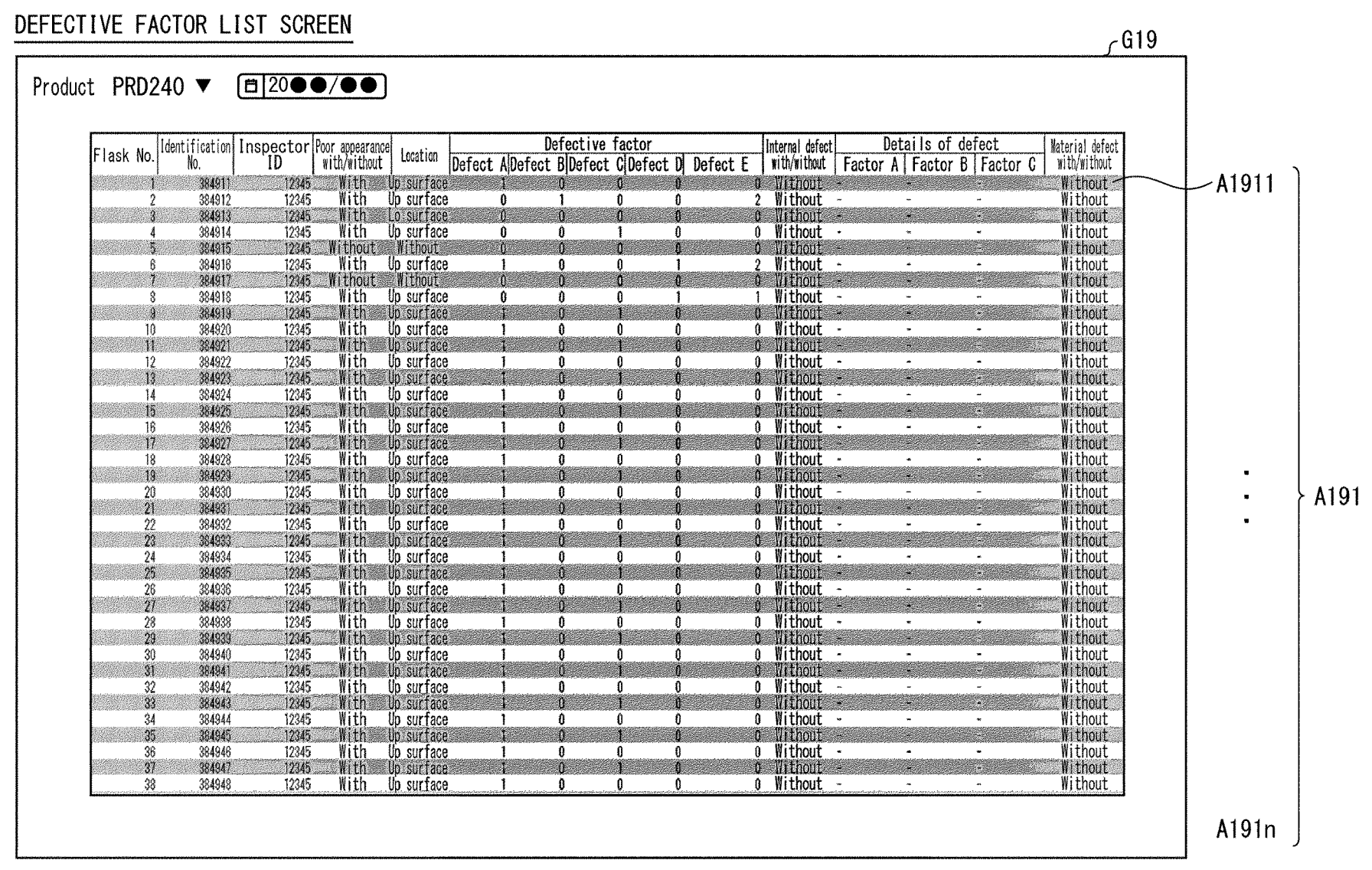

As shown in FIG. 10, the defective factor list screen G19 indicates defective factors on a per-product basis, for the products having been produced. Specifically, the defective factor list screen G19 indicates a defective product list per product (herein, per flask for product name PRD240), and includes product rows A191 including product rows A1911 to A191n. As shown in FIG. 2, when the manager selects any of the product rows A191 on the defective factor list screen G19, the defective factor list screen G19 is changed to a traceability screen G191. For example, as shown in FIG. 10, when the manager selects the product row A191n on the defective factor list screen G19, the defective factor list screen G19 is changed to a traceability screen G191n, which indicates conditions for production of a product.

Figure 11:
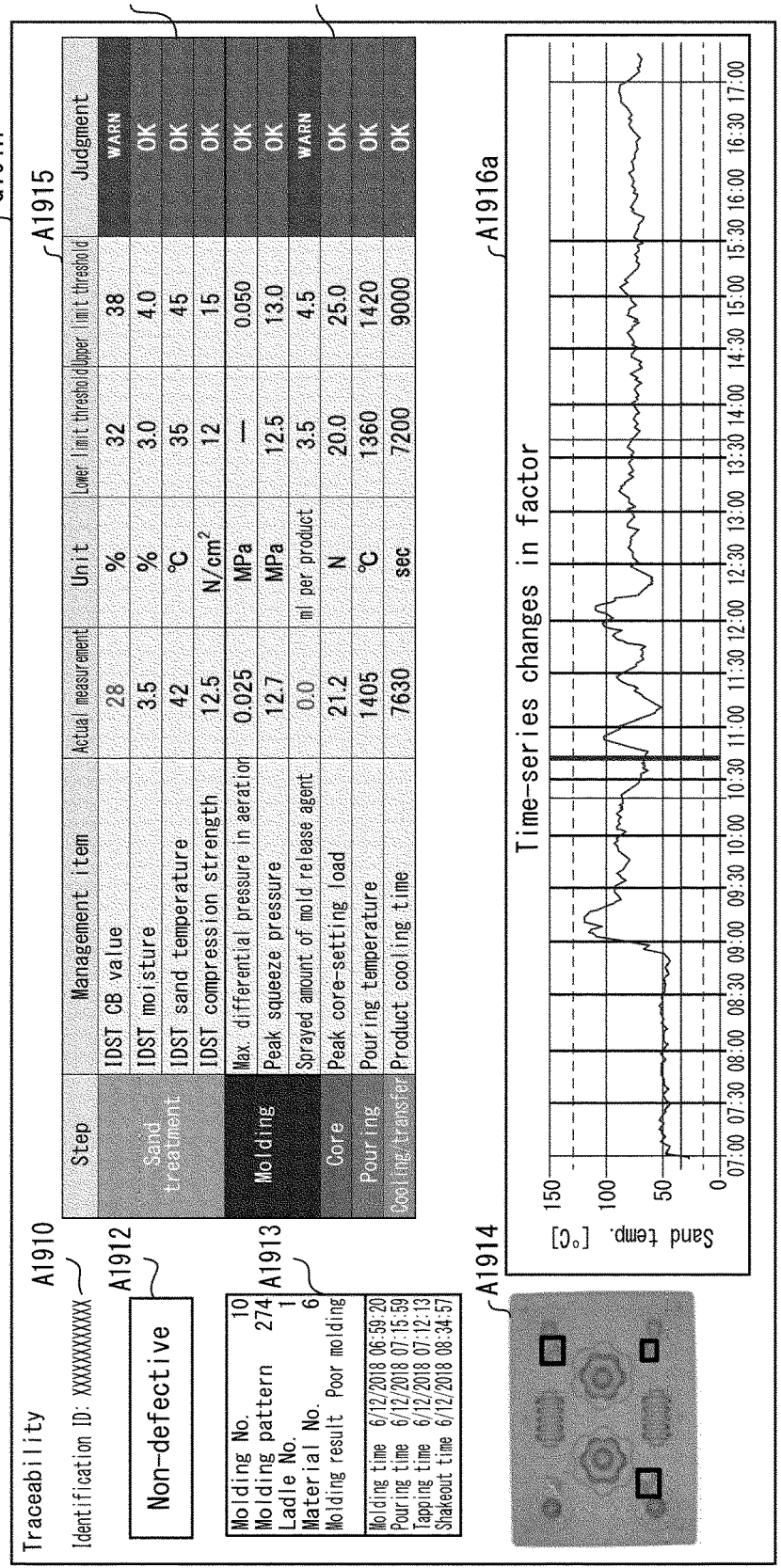
FIG. 11 is a view illustrating one example of a screen generated by the management device in accordance with Embodiment 1.
Figure 12:
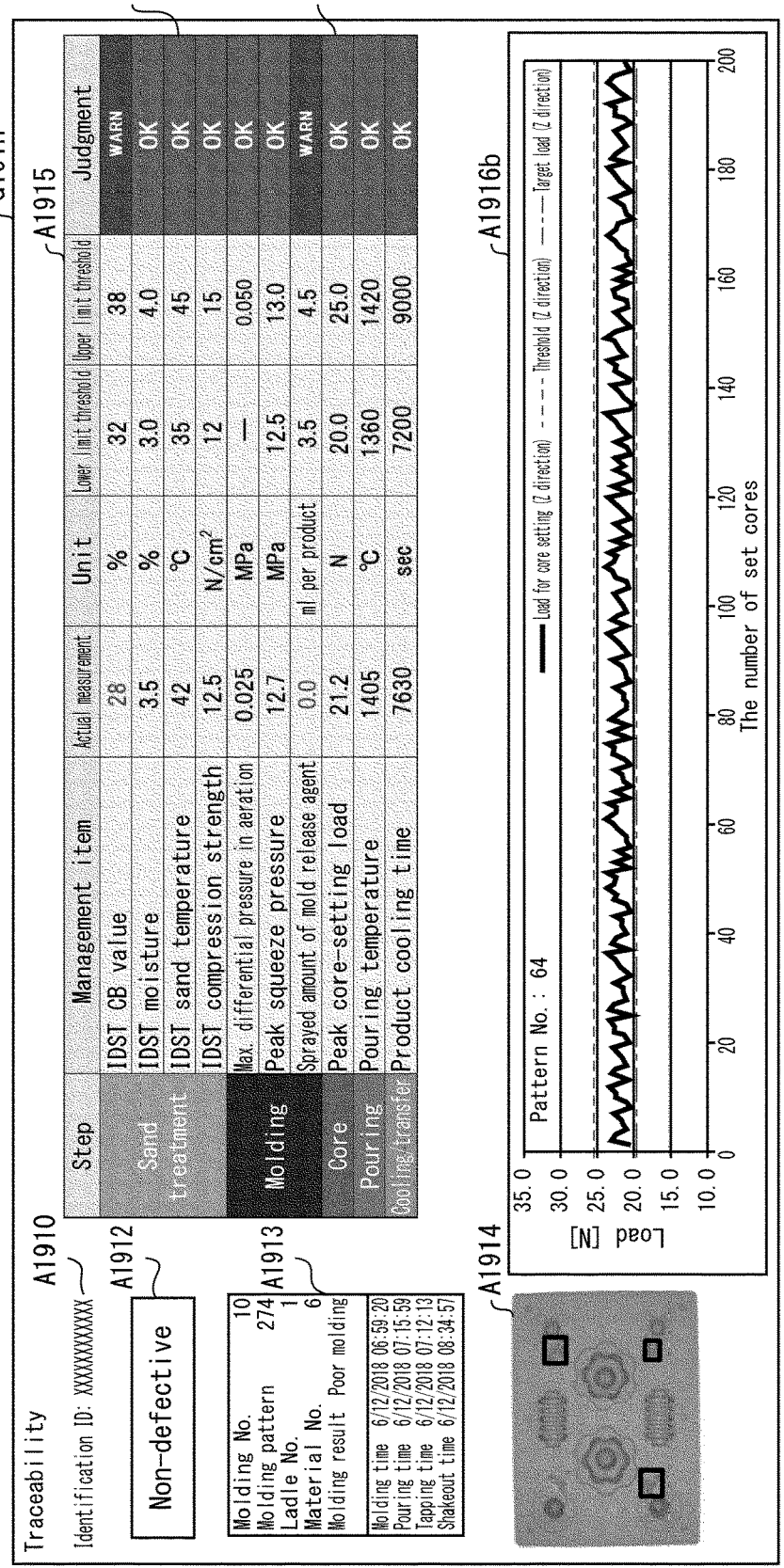
FIG. 12 is a view illustrating one example of a screen generated by the management device in accordance with Embodiment 1.

As shown in FIG. 11, the traceability screen G191n includes an identification ID area A1910, an inspection result area A1912, an information area A1913, an image area A1914, a management item list area A1915, and a management item graph area A1916a. In FIG. 11, the identification ID area A1910 indicates "XXXXXXXXXXXX" as an identification ID of the product. Alternatively, the manager can directly input the identification ID to the identification ID area. The inspection result area A1912 indicates whether the product is non-defective or defective. The information area A1913 indicates various kinds of information such as a molding number, a molding pattern, a ladle number, a material number, a molding result, a molding time, a pouring time, a tapping time, and a shakeout time of the product. The image area A1914 indicates, for example, an image such as those shown in FIG. 11, in a case where the management system 1 employs a mold drop detector (not illustrated). The management item list area A1915 indicates a list of the management items. In a case where the manager selects one of the rows of the management items in the management item list area A1915, a management item graph area corresponding to the selected one of the management items is indicated on the traceability screen G191n as a time-series graph. For example, in FIG. 11, a management item row A19153 for a sand temperature is selected in the management item list area A1915, and a management item graph area A1916a for the sand temperature is indicated on the traceability screen G191n. Meanwhile, when the manager selects, in the management item list area A1915, a management item row A19157 for a peak core-setting load, a management item graph area A1916b for the core-setting load peak is indicated on the traceability screen G191n.

[Variations]

In the above-described example, in the first displaying process, the controller 22 of the management device 2 displays, on the display of the output device 28, the top screen G1 including both the first indicator group I1 and the screen change area group A1. However, Embodiment 1 is not limited to such an aspect. In a first display device, a controller 22 of a management device 2 may display, on a display of an output device 28, a top screen G1 including a first indicator group constituted by indicators corresponding to a plurality of steps included in a production line 3 and indicating the states of the respective steps, like the first indicator group I1. For example, the controller 22 of the management device 2 may display a top screen G1 including only a first indicator group I1. For another example, the controller 22 of the management device 2 may display a top screen G1 including a first indicator I1 group and a screen change area group A1 as well as an additional indicator group and an additional area group.

In the above-described example, the first indicator group I1 is constituted by the sand treatment indicator I11, the molding indicator I12, the core indicator I13, the melting and pouring indicator I14, the cooling and transfer indicator I15, and the post-treatment indicator I16. However, in Embodiment 1, the configuration of the first indicator group I1 is not particularly limited. For example, in a case where the production line 3 includes a sand treatment step, a molding step, a core step, a pouring step, a cooling and transfer step, and other step(s), the first indicator group I1 may be configured so as to deal with these steps. Specifically, the first indicator group I1 may include a pouring indicator (not illustrated) and other indicator(s) (not illustrated) in place of the melting and pouring indicator I14 and the post-treatment indicator I16. In this case, the production line 3 may include pouring equipment (not illustrated) and other equipment in place of the melting and pouring equipment M4 and the post-treatment equipment M6 so as to deal with the steps.

Embodiment 2

In Embodiment 1, the first displaying process displays, on the display, the top screen G1 including (a) the first indicator group I1 indicating the states of the respective steps and (b) the screen change area group A1 functioning as a GUI element configured to change the screen to be displayed on the display to the third screen configured to indicate defective rates on a per-product-kind basis or on a per-defect-kind basis or the fourth screen configured to indicate defective factors on a per-product basis. However, the present invention is not limited to such an aspect, and may have another aspect. Alternatively, for example, the present invention may employ a configuration in which the first displaying process displays, on the display, a top screen G2 including (a) a first indicator group I3 indicating the states of the respective steps and (b) a second indicator group I2 indicating operating states of production devices used in the steps. The following will describe such an embodiment. For convenience of description, members having functions identical to those described in Embodiment 1 are assigned identical referential numerals, and their descriptions are omitted here. The processes included in the management method can be executed by a management system 1, similarly to Embodiment 1. Therefore, a description of the management system 1 is omitted here.

[Management Method]

Figure 13:
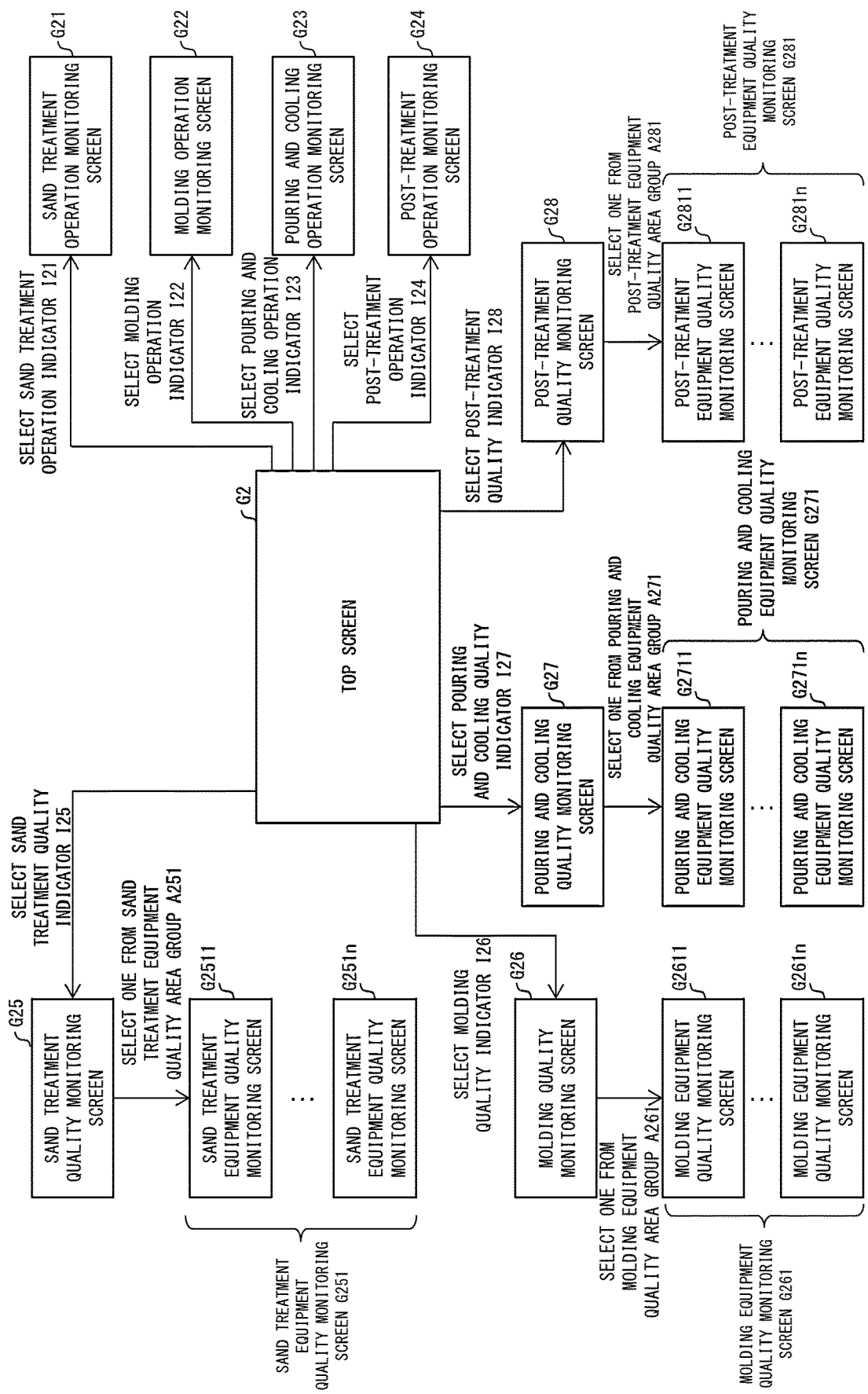
FIG. 13 is a screen change diagram illustrating how screens generated by a management device in accordance with Embodiment 2 are changed from one to another.

The management method in accordance with Embodiment 2 includes a first displaying process, a second displaying process, a third displaying process, and a fourth displaying process. With reference to FIGS. 13 to 17, the following will describe details of the management method in accordance with Embodiment 2. FIG. 13 is a screen change diagram illustrating how screens generated by a management device 2 in accordance with Embodiment 2 are changed from one to another. Each of FIGS. 14 to 17 is a view illustrating one example of a screen generated by the management device 2 in accordance with Embodiment 2. In Embodiment 1, the controller 22 of the management device 2 carries out screen changing in which the top screen G1 is centered on, as shown in FIG. 2. Meanwhile, Embodiment 2 carries out screen changing in which the top screen G2 is centered on, as shown in FIG. 13.

(First Displaying Process and Second Displaying Process)

Figure 14:
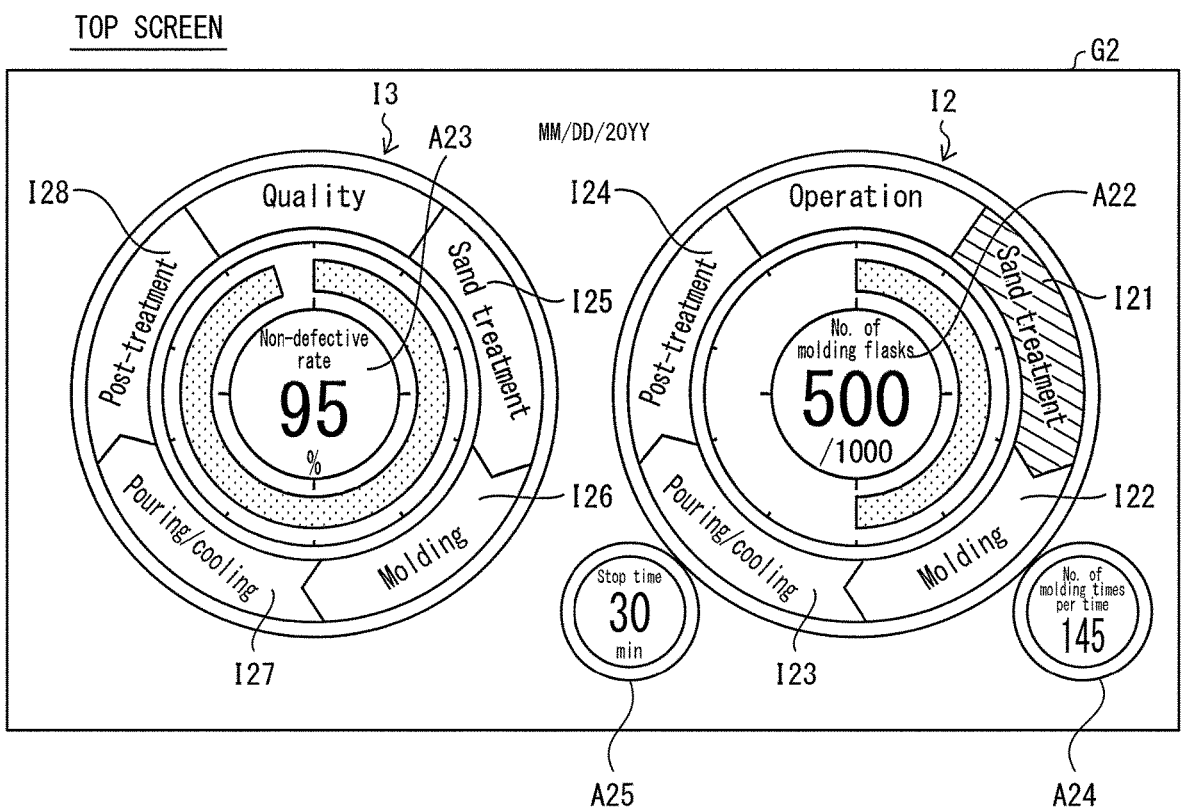
FIG. 14 is a view illustrating one example of a screen generated by the management device in accordance with Embodiment 2.

As shown in FIG. 14, a controller 22 of the management device 2 displays, on a display of an output device 28, the top screen (first screen) G2 including the first indicator group I3 and the second indicator group I2. The first indicator group I3 is constituted by indicators corresponding to their respective steps included in the production line 3 and indicating the states of their respective steps. The second indicator group I2 is constituted by indicators corresponding to their respective steps included in the production line 3 and indicating the operating states of the production devices used in their corresponding steps. That is, the first indicator group I3 is an indicator group corresponding to the first indicator group I1 of Embodiment 1.

The controller 22 of the management device 2 displays, on the display of the output device 28, a second screen (for example, FIG. 15) indicating further details of a selected step selected from the plurality of steps in the first indicator group I3 indicated on the left part of FIG. 14 (second displaying process). That is, the controller 22 of the management device 2 displays, on the display, the second screen changed from the top screen G2 in response to a manipulation on the first indicator group I3 indicated on the left part of FIG. 14.

Here, as shown in FIG. 14, the first indicator group I3 on the top screen G2 is constituted by a sand treatment quality indicator I25, a molding quality indicator I26, a pouring and cooling quality indicator I27, and a post-treatment quality indicator I28. Among the sand treatment quality indicator I25, the molding quality indicator I26, the pouring and cooling quality indicator I27, and the post-treatment quality indicator I28, an indicator corresponding to the selected step functions as a GUI element configured to change a screen to be displayed on the display from the top screen G2 to a second screen configured to indicated further details of the state of that step.

Specifically, as shown in FIG. 13, when the manager selects the sand treatment quality indicator I25 via an input device 27, the top screen G2 is changed to a sand treatment quality monitoring screen (second screen) G25. When the manager selects the molding quality indicator I26, the top screen G2 is changed to a molding quality monitoring screen (second screen) G26 (not illustrated). When the manager selects the pouring and cooling quality indicator I27, the top screen G2 is changed to a pouring and cooling quality monitoring screen (second screen) G27 (not illustrated). When the manager selects the post-treatment quality indicator I28, the top screen G2 is changed to a post-treatment quality monitoring screen (second screen) G28 (not illustrated).

Thus, among the sand treatment quality indicator I25, the molding quality indicator I26, the pouring and cooling quality indicator I27, and the post-treatment quality indicator I28 on the top screen G2, an indicator corresponding to the selected step functions as a GUI element configured to change the screen to be displayed on the display from the top screen G2 to a second screen configured to indicate further details of the state of that step. Consequently, it is possible to suitably present, to the manager, the states of the respective steps included in the production line 3.

As shown in FIG. 14, the top screen G2 may include at least one of a non-defective rate indication area A23 and a molding flask quantity indication area (quantity indication area) A22. The non-defective rate indication area A23 indicates a non-defective rate of final products (i.e., a non-defective rate of products) produced within a certain period of time (here, within 24 hours). The molding flask quantity indication area (quantity indication area) A22 indicates the number of final products produced within a certain period of time. With this, it is possible to more suitably manage the state of the production line.

As shown in FIG. 14, on the top screen G2, the first indicator group I3 may be annularly arranged so as to surround the non-defective rate indication area A23. With this, it is possible to more suitably present, to the manager, the information indicated by the first indicator group I3 and the non-defective rate indication area A23. Alternatively, on the top screen G2, the second indicator group I2 may be annularly arranged so as to surround the molding flask quantity indication area A22. With this, it is possible to more suitably present, to the manager, the information indicated by the second indicator group I2 and the molding flask quantity indication area A22.

As shown in FIG. 14, the top screen G2 may further include at least one of (a) a stop time indication area A25 indicating the sum of periods of time in which the pieces of equipment corresponding to the processes are stopped during a period of 24 hours and (b) a number-of-molding-times per unit time indication area A24 indicating the number of times of molding per unit time. With this, it is possible to suitably manage the state of the production line 3. Note that the number of molding times per unit time refers to the number of times to carry out molding for producing a product per unit operating time (for example, 8 hours) in which equipment for its corresponding process continuously operates.

(Third Displaying Process)

The controller 22 of the management device 2 displays, on the display, a third screen (for example, FIG. 17) configured to indicate further details of an operating state of a production device used in a selected step selected from the plurality of steps in the second indicator group I2 indicated on the right part of FIG. 14 (third displaying process). That is, the controller 22 of the management device 2 displays, on the display, the third screen changed from the top screen G2 in response to a manipulation on the second indicator group I2 indicated on the right part of FIG. 14.

As shown in FIG. 14, on the top screen G2, an indicator corresponding to the selected step among the sand treatment operation indicator I21, the molding operation indicator I22, the pouring and cooling operation indicator I23, and the post-treatment operation indicator I24 constituting the second indicator group I2 functions as a GUI element configured to change a screen to be displayed on the display from the top screen G2 to the third screen.

Specifically, as shown in FIGS. 13 and 14, when the manager selects the sand treatment operation indicator I21 via an input device 27, the top screen G2 is changed to a sand treatment operation monitoring screen (third screen) G21. When the manager selects the molding operation indicator I22, the top screen G2 is changed to a molding operation monitoring screen (third screen) G22 (not illustrated). When the manager selects the pouring and cooling operation indicator I23, the top screen G2 is changed to a pouring and cooling operation monitoring screen (third screen) G23 (not illustrated). When the manager selects the post-treatment operation indicator I24, the top screen G2 is changed to a post-treatment operation monitoring screen (third screen) G24 (not illustrated).

The sand treatment operation monitoring screen G21, the molding operation monitoring screen G22, the pouring and cooling operation monitoring screen G23, and the post-treatment operation monitoring screen G24 respectively indicate the histories of the operating states and abnormalities of the production devices in the pieces of equipment for their corresponding steps. The operating state of the production device refers to a normal state or an abnormal state of the production device. The abnormal state of the production device refers to, for example, a state in which an overload is applied to a motor of the production device, a temperature is risen, and/or a management value(s) of a cycle time period and a control factor(s) (e.g., a temperature, a pressure, an air flow rate of a dust collection machine) for the step exceeds a threshold(s). For example, as shown in FIG. 17, the sand treatment operation monitoring screen G21 indicates, in production device rows A2111 to S2114, whether a production device MIA, a sand treatment line, an MIE, and a dust collection machine in the sand treatment equipment M1 are in a normal state or an abnormal stop state. With this, for example, in a case where the sand treatment operation indicator I21 among the second indicator group I2 issues an alert or a warning, the manager can grasp which of the production devices in the sand treatment equipment M1 made a cause of the warning or alert issued by the sand treatment operation indicator I21. In addition, in FIG. 17, the sand treatment operation monitoring screen G21 indicates histories A212 of abnormality contents of a production device that is in an abnormal stop state. With this, the manager can suitably grasp the operating state(s) of the production device(s) in the sand treatment equipment M1.

Thus, with the top screen G2 including the second indicator group I2, the manager can grasp the operating states of the production devices used in the steps included in the production line 3.

Among the plurality of indicators constituting the second indicator group I2 on the top screen G2 shown in FIG. 14, at least one indicator may be an indicator configured to indicate, in a stepwise manner, normality of a production device used in a step corresponding to the at least one indicator. For example, in FIG. 14, the operating state of a production device used in the sand treatment is not normal, and therefore the sand treatment operation indicator I21 is indicated in a color different from those of other indicators. In this case, when the state of the sand treatment is at an alert level, the sand treatment operation indicator I21 may be indicated in yellow. Meanwhile, when the state of the sand treatment is at a warning level, the sand treatment indicator I21 may be indicated in red. With this, the manager can grasp normality of the production devices used in the steps included in the production line 3 in a stepwise manner.

(Fourth Displaying Process)

The controller 22 of the management device 2 displays a fourth screen (for example, FIG. 16) that is a screen corresponding to a selected production device, which is selected from a plurality of production devices used in the selected step indicated on the second screen (for example, FIG. 15), and that is configured to indicate a time-series state of the step executed by the production device (fourth displaying process). That is, the controller 22 of the management device 2 displays, on the display, the fourth screen that has been changed from the second screen in response to a selection of the production device made via the second screen and that indicates further details of the step to be executed by the production device selected via the second screen.

Here, as shown in FIG. 13, a sand treatment quality monitoring screen G25, which is the second screen, includes a sand treatment equipment quality area group (state indication area group) A251. The sand treatment equipment quality area group A251 includes equipment quality indication areas (state indication areas) respectively corresponding to a plurality of production devices used in the sand treatment (selected step), and respectively indicate the states of steps to be executed by the corresponding production devices. A molding quality monitoring screen G26 includes a molding equipment quality area group A261. The molding equipment quality area group A261 includes equipment quality indication areas respectively corresponding to a plurality of production devices used in the molding, and respectively indicate the states of steps to be executed by the corresponding production devices. A pouring and cooling quality monitoring screen G27 includes a pouring and cooling equipment quality area group A271. The pouring and cooling equipment quality area group A271 includes equipment quality indication areas respectively corresponding to a plurality of production devices used in the pouring and cooling, and respectively indicate the states of steps to be executed by the corresponding production devices. A post-treatment quality monitoring screen G28 includes a post-treatment equipment quality area group A281. The post-treatment equipment quality area group A281 includes equipment quality indication areas respectively corresponding to a plurality of production devices used in the post-treatment, and respectively indicate the states of steps to be executed by the corresponding production devices.

As shown in FIG. 13, among the equipment quality areas (state indication areas) constituting the sand treatment equipment quality area group A251, the molding equipment quality area group A261, the pouring and cooling equipment quality area group A271, and the post-treatment equipment quality area group A281 respectively indicated on the sand treatment quality monitoring screen (second screen) G25, the molding quality monitoring screen (second screen) G26, the pouring and cooling quality monitoring screen (second screen) G27, and the post-treatment quality monitoring screen (second screen) G28, an equipment quality area corresponding to the selected equipment functions as a GUI element configured to change a screen to be displayed on the display from the second screen to the fourth screen.

Specifically, as shown in FIG. 13, when the manager selects one of the sand treatment equipment quality areas constituting the sand treatment equipment quality area group (state indication area group) A251 on the sand treatment quality monitoring screen G25, the sand treatment quality monitoring screen G25 is changed to a sand treatment equipment quality monitoring screen G251 (one of the sand treatment equipment quality monitoring screens G2511 to G251*n*) via the selected one of the sand treatment equipment quality areas corresponding to the selected equipment. When the manager selects one of the molding equipment quality areas constituting the molding equipment quality area group (state indication area group) A261 on the molding quality monitoring screen G26, the molding quality monitoring screen G26 is changed to a molding equipment quality monitoring screen G261 (one of the molding equipment quality monitoring screens G2611 to G261*n*) via the selected one of the molding equipment quality areas corresponding to the selected equipment. When the manager selects one of the pouring and cooling equipment quality areas constituting the pouring and cooling equipment quality area group (state indication area group) A271 on the pouring and cooling quality monitoring screen G27, the pouring and cooling quality monitoring screen G27 is changed to a pouring and cooling equipment quality monitoring screen G271 (one of the pouring and cooling equipment quality monitoring screens G2711 to G271*n*) via the selected one of the pouring and cooling equipment quality areas corresponding to the selected equipment. When the manager selects one of the post-treatment equipment quality areas constituting the post-treatment equipment quality area group (state indication area group) A281 on the post-treatment quality monitoring screen G28, the post-treatment quality monitoring screen G28 is changed to a post-treatment equipment quality monitoring screen G281 (one of the post-treatment quality monitoring screens G2811 to G281n) via the selected one of the post-treatment equipment quality areas corresponding to the selected equipment.

Figure 15:
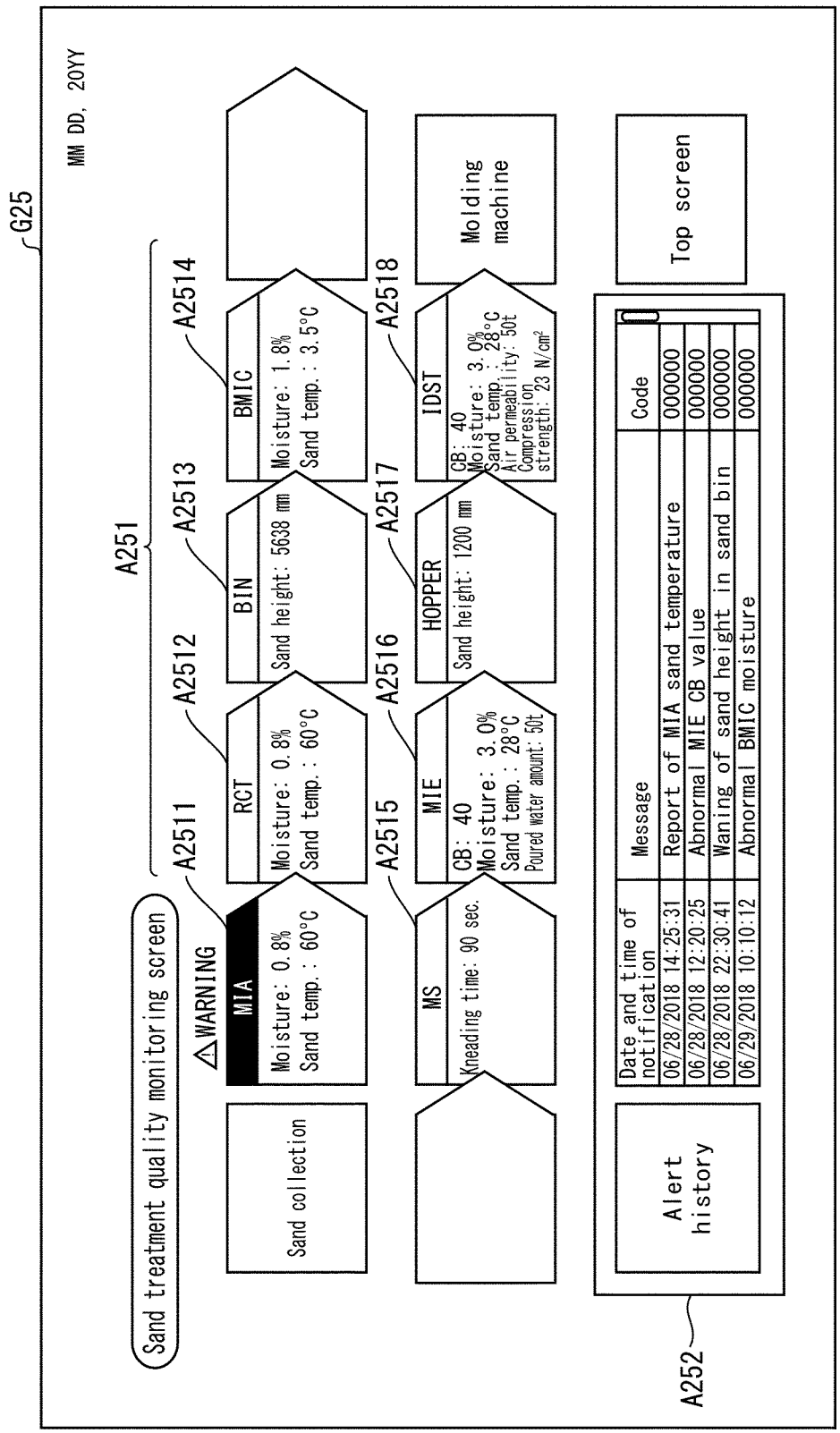
FIG. 15 is a view illustrating one example of a screen generated by the management device in accordance with Embodiment 2.
Figure 16:
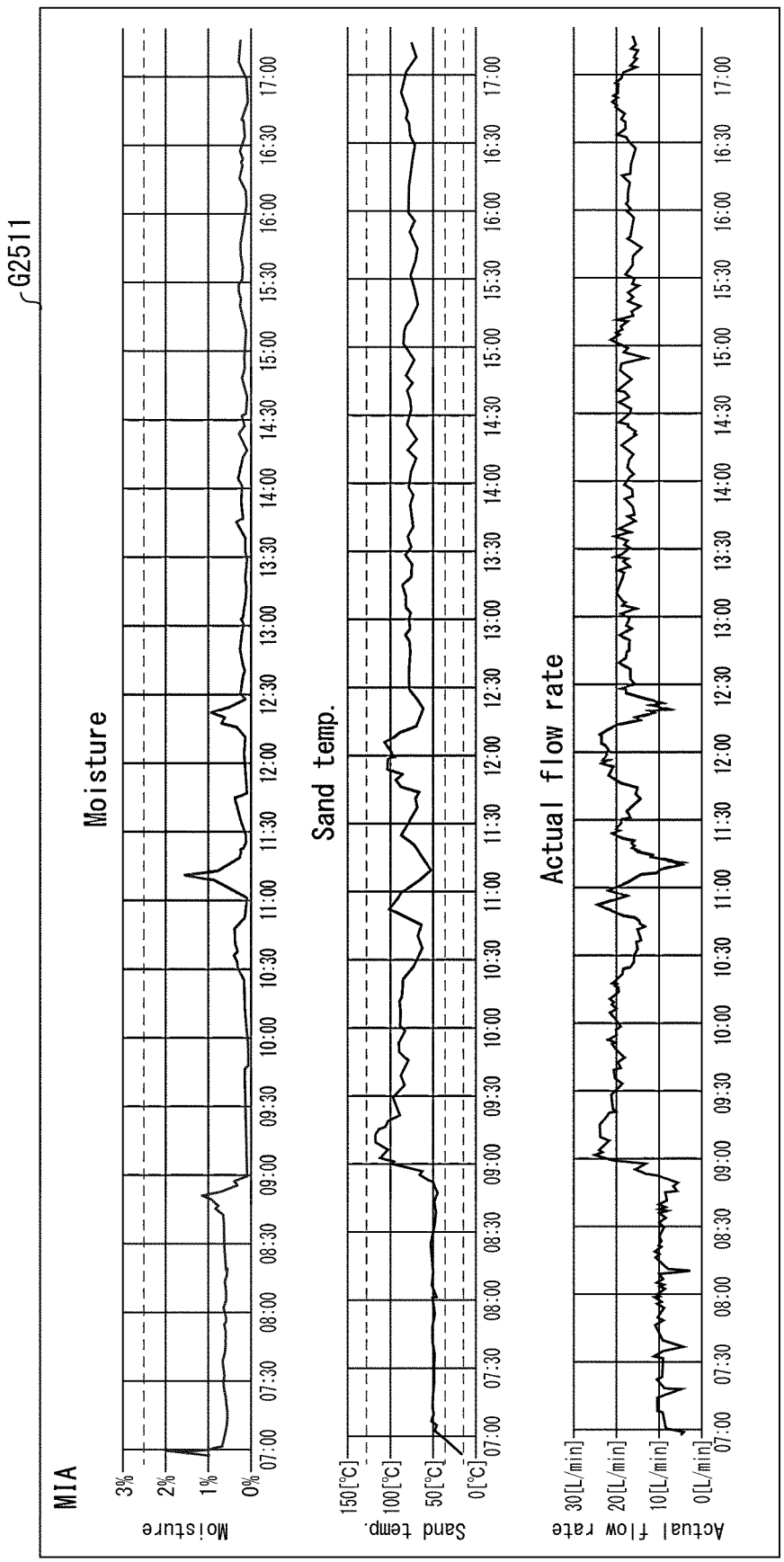
FIG. 16 is a view illustrating one example of a screen generated by the management device in accordance with Embodiment 2.

More specifically, as shown in FIG. 15, the sand treatment quality monitoring screen G25 includes the sand treatment equipment quality area group (state indication area group) A251 constituted by an MIA area (state indication area) A2511, an RCT area (state indication area) A2512, a BIN area (state indication area) A2513, a BMIC area (state indication area) A2514, an MS area (state indication area) A2515, an MIE area (state indication area) A2516, a HOPPER area (state indication area) A2517, and an IDST area (state indication area) A2518, which respectively indicates the states of steps to be executed in the production devices (MIA, RCT, BIN, BMIC, MS, MIE, HOPPER, and IDST) used in the step corresponding to the sand treatment quality monitoring screen G25. When the manager selects the MIA from among the state indication areas constituting the sand treatment equipment quality area group A251 on the sand treatment quality monitoring screen G25, the sand treatment quality monitoring screen G25 is changed to the sand treatment equipment quality monitoring screen G2511 via the MIA area A2511 corresponding to the MIA, which is the selected equipment. As shown in FIG. 16, the sand treatment equipment quality monitoring screen G2511 is a screen showing horizontal axes each indicating a time of collection of a management object and vertical axes indicating a moisture content, a sand temperature, and an actual flow rate of the management object to be processed or used in the MIA. Thus, the sand treatment equipment quality monitoring screen G2511 shows a time-series state of the step to be executed by the production device used in the sand treatment. With this, the manager can grasp the time-series states of the steps to be executed by the production devices.

Note that at least one equipment quality area of the equipment quality areas (state indication areas) constituting the equipment quality area group (state indication area group) on the second screen may function as an indicator indicating a state of a step to be executed by a production device corresponding to the equipment quality area. For example, as shown in FIG. 15, when the state of the step to be executed by the MIA used in the sand treatment is at a warning level, the MIA area A2511 included in the sand treatment equipment quality area group A251 on the sand treatment quality monitoring screen G25 provides a warning indication by indicating the letters "WARNING". With this, the manager can more suitably grasp the states of the steps to be executed by the production devices corresponding to the steps included in the production line 3.

In addition, the sand treatment quality monitoring screen G25 shown in FIG. 15 may indicate an alert history A252, which is a history of a warning indication(s) given by any of the state indication areas constituting the sand treatment equipment quality area group A251. With this, the manager can grasp time-series states of the steps to be executed by the production devices corresponding to the steps included in the production line 3.

[Variations]

In the above-described examples, the controller 22 of the management device 2 displays, on the display of the output device 28, the top screen (first screen) G2 including the first indicator group I3 and the second indicator group I2. However, Embodiment 2 is not limited to such an aspect. Alternatively, in Embodiment 2, the controller 22 of the management device 2 may display, on the display of the output device 28, the first indicator group I1 of Embodiment 1, in place of the first indicator group I3. In this case, the controller 22 of the management device 2 may position the second indicator group I2 at a location of the first indicator group I3 and position the first indicator group I1 at a location of the second indicator group I2 so that the indicator groups are arranged in the same manner as in Embodiment 1. That is, the controller 22 of the management device 2 can arbitrarily determine horizontal arrangement of the indicator groups and the area groups.

[Software Implementation Example]

Control blocks (particularly, the controllers 22 and P1 to P6) of the management device 2 and the production line 3 in the management system 1 can be realized by a logic circuit (hardware) provided in an integrated circuit (IC chip) or the like or can be alternatively realized by software.

In the latter case, the management device 2 and the production line 3 include a computer that executes instructions of a program that is software realizing the foregoing functions. The computer, for example, includes at least one processor and at least one computer-readable storage medium storing the program. An object of an aspect of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

A management method in accordance with an embodiment of the present invention is a management method for managing a production line including a plurality of steps. The management method includes: carrying out a first displaying process for displaying, on a display, a first screen configured to indicate states of the respective plurality of steps by a first indicator group constituted by indicators corresponding to the plurality of steps; and carrying out a second displaying process for displaying, on the display, a second screen configured to indicate further details of a certain step among the plurality of steps. Among the first indicator group, an indicator corresponding to the certain step functions as a graphical user interface element configured to change a screen to be displayed on the display from the first screen to the second screen.

With the above-described configuration, among the first indicator group indicated on the first screen, the indicator corresponding to the certain step functions as a GUI element configured to change the screen to be displayed on the display from the first screen to the second screen, which is configured to indicate further details of the state of the certain step.

Consequently, it is possible to more suitably present, to the manager, the states of the respective steps included in the production line, as compared to the technique of Patent Literature 1 according to which the states are displayed on the screen not on a per-step basis but on a per-information basis, i.e., for the production-related information, the security-related information, and the product quality information, the techniques of Patent Literatures 2 and 3 according to which only the contents of abnormalities in the steps are displayed on the screen, and the technique of Patent Literature 4 according to which the list indicating the states of the products obtained in the respective steps of the production line is displayed on the screen. Consequently, it is possible to suitably manage the states of the respective steps included in the production line.

In the management method in accordance with the embodiment of the present invention, the first indicator group preferably includes at least one indicator configured to indicate, in a stepwise manner, a state of a step corresponding to said at least one indicator.

With the above configuration, at least one indicator indicates, in a stepwise manner, the state of the step corresponding to the at least one indicator. Consequently, the manager can grasp the state in a stepwise manner.

In the management method in accordance with the embodiment of the present invention, the management method preferably further includes carrying out a third displaying process for displaying, on the display, a third screen configured to indicate defective rates on a per-product-kind basis or on a per-defect-kind basis, for products having been produced. In addition, the first screen preferably further includes a first area configured to function as a graphical user interface element configured to change the screen to be displayed on the display from the first screen to the third screen.

With the above-described configuration, the first area on the first screen functions as a GUI element configured to change the screen to be displayed on the display from the first screen to the third screen configured to indicate defective rates on a per-product-kind basis or on a per-defect-kind basis, for the products having been produced. Consequently, the manager can grasp the states of the products having been produced.

In the management method in accordance with the embodiment of the present invention, the management method preferably further includes carrying out a fourth displaying process for displaying, on the display, a fourth screen configured to indicate defective factors on a per-product basis, for products having been produced. In addition, the first screen preferably further includes a second area configured to function as a graphical user interface element configured to change the screen to be displayed on the display from the first screen to the fourth screen.

With the above-described configuration, the second area on the first screen functions as a GUI element configured to change the screen to be displayed on the display from the first screen to the fourth screen configured to indicate defective factors on a per-product basis, for the products having been produced.

Consequently, the manager can grasp the states of the products having been produced.

A management method in accordance with an embodiment of the present invention is a management method for managing a production line including a plurality of steps. The management method includes: carrying out a first displaying process for displaying, on a display, a first screen configured to indicate (a) states of the respective plurality of steps by a first indicator group constituted by indicators corresponding to the plurality of steps and (b) operating states of production devices used in the plurality of steps by a second indicator group constituted by indicators corresponding to the plurality of steps; carrying out a second displaying process for displaying, on the display, a second screen configured to indicate further details of a certain step among the plurality of steps; and carrying out a third displaying process for displaying, on the display, a third screen configured to indicate further details of an operating state of a production device used in a certain step. Among the first indicator group, an indicator corresponding to a certain step functions as a graphical user interface element configured to change the screen to be displayed on the display from the first screen to the second screen. Among the second indicator group, an indicator corresponding to a certain step functions as a graphical user interface element configured to change the screen to be displayed on the display from the first screen to the third screen.

With the above-described configuration, the indicator on the first screen functions as a GUI configured to change the screen to be displayed on the display from the first screen to the second screen or as a GUI configured to change the screen to be displayed on the display from the first screen to the third screen. Consequently, the manager can grasp the states of the respective steps included in the production line or the states of the production devices used in the steps.

Note that the step whose detailed state is indicated in the second displaying process (such a step will be expressed as the "certain step") and the step whose detailed state is indicated in the third displaying process (such a step will be expressed as the "certain step") may be identical to each other or may be different from each other.

In the management method in accordance with the embodiment of the present invention, the first indicator group preferably includes at least one indicator configured to indicate, in a stepwise manner, a state of a step corresponding to said at least one indicator.

With the above-described configuration, at least one indicator indicates, in a stepwise manner, the state of a step corresponding to the at least one indicator. Consequently, the manager can grasp the states of the respective steps included in the production line in a stepwise manner.

In the management method in accordance with the embodiment of the present invention, the second indicator group preferably includes at least one indicator configured to indicate, in a stepwise manner, an operating state of a production device used in a step corresponding to said at least one indicator.

With the above-described configuration, at least one indicator indicates, in a stepwise manner, the operating state of a production device used in a step corresponding to the at least one indicator. Consequently, the manager can grasp the operating states of the production devices used in the steps included in the production line in a stepwise manner.

In the management method in accordance with the embodiment of the present invention, the first indicator group is preferably annularly arranged on the first screen.

With the above-described configuration, it is possible to present, to the manager, the first indicator group in such a manner that the manager can more easily grasp the first indicator group visually.

A management device in accordance with an embodiment of the present invention is a management device for managing a production line that includes a plurality of steps, the management device including a controller, wherein the controller is configured to execute each process included in the management method.

The above-described configuration can provide the same effects as those given by the above-described management method.

In the management device in accordance with the embodiment of the present invention, the controller may include a processor and a memory, and the processor may be configured to execute each process included in the management method in accordance with a program stored in the memory.

The above-described configuration can provide the same effects as those given by the above-described management method.

Note that the management method in accordance with the embodiments of the present invention is applicable to production lines for casting, for example. In this case, examples of the steps included in the production line encompass a sand treatment step, a molding step, a core step, a melting and pouring step, a cooling and transfer step, and a post-treatment step.

The sand treatment step in the production line for a casting is a step of separating and removing a contaminant from collected sand, measuring the temperature, moisture content, and/or the like of the collected sand, adding, to the collected sand, water in an amount proportional to the measurement value(s), and adding an additive such as bentonite and water to the collected sand and stirring a resultant to knead the collected sand so that kneaded sand is prepared. In the sand treatment step, for example, CB, a moisture content, a sand temperature, an air permeability, and a compression strength are managed as parameters for defining the state of the sand treatment step.

Thus, for example, on the first screen, the indicator corresponding to the sand treatment step comprehensively indicates a state of the sand treatment step which state has been determined based on these parameters. In one example, the comprehensive state of the sand treatment step is indicated by three levels expressed with colors, specifically, by a normal level (e.g., blue), an alert level (e.g., yellow), and an abnormal level (e.g., red). If all the above-described parameters in the sand treatment step are within a normal range, the indicator is indicated in blue. Meanwhile, if even one of the parameters exceeds a normal range and reaches an alert level, the indicator is indicated in yellow in order to call manager's attention. Furthermore, if even one of the parameters reaches a critical level, the indicator is indicated in red in order to give a warning to the manager. In this case, the indicator urges the manager to conduct maintenance on the production line, or urges the manager to stop the production line, if necessary.

When any of the indicators calls an attention or gives a warning on the first screen, the manager should check further detailed information to grasp at which part of the step and what kind of problem has occurred. Thus, the indicator on the first screen functions as a GUI element configured to change the display from the first screen to the second screen. For example, assume a case where the indicator for the sand treatment in the first screen changes from yellow to red. In this case, when the manager manipulates this indicator, the display is changed from the first screen to the second screen. The second screen corresponding to the sand treatment indicates the parameter values (e.g., CB, a moisture content, a sand temperature, and/or a compression strength) in an individual manner. By checking the details of the states of the parameters on the second screen, the manager can grasp, via the second screen, at which part the abnormality indicated by the indicator on the first screen has occurred. With this, the manager can quickly find and cope with a defective product and/or an abnormality occurred in the production line.

The molding step is a step of charging, into a molding flask, the kneaded sand obtained as a result of the sand treatment step, and pressing the sand to prepare a mold. In the molding step, for example, a sprayed amount of a mold release agent, a squeeze pressure (peak squeeze pressure), and a compression rate (mold compression rate) are managed as parameters for defining the state of the molding step. Among the indicators on the first screen, an indicator corresponding to the molding step comprehensively indicates a state of the molding step which state has been determined based on these parameters, for example. Similarly to the indicator corresponding to the sand treatment step, the indicator corresponding to the molding step is indicated in blue, yellow, or red according to the state of the production, and the display is changed from the first screen to the second screen in response to a manipulation on the indicator that functions as GUI. The second screen for the molding step indicates detailed information, such as the sprayed amount of the mold release agent, the squeeze pressure, and the compression rate.

The core step is a step of putting an auxiliary mold, which is called a core, into the mold in order to form a hollow part in a casting. In the core step, for example, a peak setting load, which is a load (peak) for setting, is managed as a parameter for defining the state of the core step. The indicator corresponding to the core step comprehensively indicates a state of the core step which state has been determined based on the parameter, for example. The display is changed from the first screen to the second screen in response to a manipulation on the indicator, in the same manner as in the other steps described above.

The melting and pouring step is a step of melting an iron and/or the like to prepare a molten metal and pouring the molten metal into the mold. In the melting and pouring step, for example, a pouring temperature, a pouring weight, and a fading time of Mg are managed as parameters for defining the state of the melting and pouring. The indicator corresponding to the melting and pouring step comprehensively indicates a state of the melting and pouring which state has been determined based on these parameters, for example. The display is changed from the first screen to the second screen in response to a manipulation on the indicator, in the same manner as in the other steps described above.

The cooling and transfer step is a step of leaving the molten metal in the mold for a certain period of time and transferring the mold while cooling the molten metal. In the cooling and transfer step, for example, a cooling time is managed as a parameter for defining the state of the cooling and transfer step. The indicator corresponding to the cooling and transfer step comprehensively indicates a state of the cooling and transfer step which state has been determined based on the parameter, for example. The display is changed from the first screen to the second screen in response to a manipulation on the indicator, in the same manner as in the other steps described above.

The post-treatment step is, for example, a step of shaking out the mold so that the mold is separated into a product and sand. In the post-treatment step, for example, a shot-blasting time is managed as a parameter for defining the state of the post-treatment step. The indicator corresponding to the post-treatment step comprehensively indicates a state of the post-treatment step which state has been determined based on the parameter, for example. The display is changed from the first screen to the second screen in response to a manipulation on the indicator, in the same manner as in the other steps described above.

REFERENCE SIGNS LIST

1: Management system
2: Management device
3: Production line
22, P1, P2, P3: Controller
A2511: MIA area (state indication area)
A1: Screen change area group
I11: Sand treatment indicator
I12: Molding indicator
I13: Core indicator
I14: Pouring indicator
I15: Transfer indicator
I16: Post-treatment indicator
A11: Analysis area (screen change area)
A12: Inspection result input area (screen change area)
A13: Traceability area (screen change area)
I21: Sand treatment operation indicator
I22: Molding operation indicator
I23: Cooling operation indicator
I24: Post-treatment operation indicator
I25: Sand treatment quality indicator
A251: Sand treatment equipment quality area group (state indication area group)
A261: Molding equipment quality area group (state indication area group)
A271: Pouring and cooling equipment quality area group (state indication area group)
A281: Post-treatment equipment quality area group (state indication area group)
I26: Molding quality indicator
I27: Cooling quality indicator
I28: Post-treatment quality indicator
A20: Threshold matching rate indication area (non-defective rate indication area)
A21, A23: Non-defective rate indication area
A22: Molding flask quantity indication area (quantity indication area)
G1, G2: Top screen (first screen)
G11: Sand treatment screen (second screen)
G12: Molding screen (second screen)
G13: Core screen (second screen)
G14: Melting and pouring screen (second screen)
G15: Transfer screen (second screen)
G16: Post-treatment screen (second screen)
G17: Per-product defective rate screen (third screen)
G18: Inspection result manual input screen (third screen)
G19: Defective factor list screen (fourth screen)
G21: Sand treatment operation monitoring screen (third screen)
G22: Molding operation monitoring screen (third screen)
G23: Cooling operation monitoring screen (third screen)
G24: Post-treatment operation monitoring screen (third screen)
G25: Sand treatment quality monitoring screen (second screen)
G251, G2511, . . . , G251n: Sand treatment equipment quality monitoring screen (fourth screen)
G26: Molding quality monitoring screen (third screen)
G261, G2611, . . . , G261n: Molding equipment quality monitoring screen (fourth screen)
G27: Cooling quality monitoring screen (second screen)
G271, G2711, . . . , G271n: Cooling equipment quality monitoring screen (fourth screen)
G28: Post-treatment quality monitoring screen (second screen)
G281, G2811, . . . , G281n: Post-treatment equipment quality monitoring screen (fourth screen)
I1, I3: First indicator group
I2: Second indicator group
M1: Sand treatment equipment (production device)
M2: Molding equipment (production device)
M3: Core equipment (production device)
M4: Pouring equipment (production device)
M5: Transfer equipment (production device)
M6: Post-treatment equipment (production device)

The invention claimed is:

1. A management method for managing a production line for casting that includes a plurality of steps including a sand treatment step, comprising:
carrying out a first displaying process for displaying, on a display, a first screen configured to indicate states of the respective plurality of steps by a first indicator group constituted by indicators corresponding to the plurality of steps; and
carrying out a second displaying process for displaying, on the display, a second screen configured to indicate further details of a certain step among the plurality of steps, the second screen indicating values of parameters defining the state of the certain step in time series, wherein
among the parameters, a parameter defining the state of the sand treatment step is at least one selected from the group consisting of CB, a moisture content, a sand temperature, an air permeability, and a compression strength, and
among the first indicator group, an indicator corresponding to the certain step functions as a graphical user interface element configured to change a screen to be displayed on the display from the first screen to the second screen.

2. The management method as set forth in claim 1, wherein the first indicator group includes at least one indicator configured to indicate, in a stepwise manner, a state of a step corresponding to said at least one indicator.

3. The management method as set forth in claim 1, further comprising:
carrying out a third displaying process for displaying, on the display, a third screen configured to indicate defective rates on a per-product-kind basis or on a per-defect-kind basis, for products having been produced, wherein
the first screen further includes a first area configured to function as a graphical user interface element configured to change the screen to be displayed on the display from the first screen to the third screen.

4. The management method as set forth in claim 1, further comprising:
carrying out a fourth displaying process for displaying, on the display, a fourth screen configured to indicate defective factors on a per-product basis, for products having been produced, wherein
the first screen further includes a second area configured to function as a graphical user interface element configured to change the screen to be displayed on the display from the first screen to the fourth screen.

5. A management method for managing a production line for casting that includes a plurality of steps including a sand treatment step, comprising:

carrying out a first displaying process for displaying, on a display, a first screen configured to indicate (a) states of the respective plurality of steps by a first indicator group constituted by indicators corresponding to the plurality of steps and (b) operating states of production devices used in the plurality of steps by a second indicator group constituted by indicators corresponding to the plurality of steps;

carrying out a second displaying process for displaying, on the display, a second screen configured to indicate further details of a certain step among the plurality of steps, the second screen indicating values of parameters defining the state of the certain step in time series; and carrying out a third displaying process for displaying, on the display, a third screen configured to indicate further details of an operating state of a production device used in a certain step, wherein among the parameters, a parameter defining the state of the sand treatment step is at least one selected from the group consisting of CB, a moisture content, a sand temperature, an air permeability, and a compression strength, among the first indicator group, an indicator corresponding to a certain step functions as a graphical user interface element configured to change a screen to be displayed on the display from the first screen to the second screen, and among the second indicator group, an indicator corresponding to a certain step functions as a graphical user interface element configured to change the screen to be displayed on the display from the first screen to the third screen.

6. The management method as set forth in claim 5, wherein the first indicator group includes at least one indicator configured to indicate, in a stepwise manner, a state of a step corresponding to said at least one indicator.

7. The management method as set forth in claim 5, wherein the second indicator group includes at least one indicator configured to indicate, in a stepwise manner, an operating state of a production device used in a step corresponding to said at least one indicator.

8. The management method as set forth in claim 1, wherein the first indicator group is annularly arranged on the first screen.

9. A management device for managing a production line that includes a plurality of steps, comprising:
a controller, wherein
the controller is configured to execute each process included in the management method recited in claim 1.

10. The management device as set forth in claim 9, wherein
the controller includes a processor and a memory, and
the processor is configured to execute each process included in the management method in accordance with a program stored in the memory.

* * * * *